United States Patent [19]

Tsuyama et al.

[11] Patent Number: 5,636,121
[45] Date of Patent: Jun. 3, 1997

[54] TRACTION CONTROL SYSTEM FOR MOTOR VEHICLE

[75] Inventors: Toshiaki Tsuyama, Higashi-Hiroshima; Sotetsu Yoshida, Hiroshima; Yoshihisa Nakamoto, Hiroshima; Yoshinori Fukumoto, Hiroshima, all of Japan

[73] Assignee: Mazda Motor Corporation, Hiroshima-ken, Japan

[21] Appl. No.: 360,559

[22] Filed: Dec. 21, 1994

[30] Foreign Application Priority Data

Dec. 28, 1993 [JP] Japan .................. 5-338702

[51] Int. Cl.$^6$ .................. B60T 8/00; B62D 6/00
[52] U.S. Cl. .................. 364/426.01; 364/426.027; 364/424.051; 180/197
[58] Field of Search .................. 364/426.03, 426.01, 364/424.05; 180/197, 140, 141, 142; 303/139, 140, 146

[56] References Cited

U.S. PATENT DOCUMENTS

| 4,924,396 | 5/1990 | Fujioka et al. | 364/426.03 |
|---|---|---|---|
| 4,946,015 | 8/1990 | Browalski et al. | 192/1.23 |
| 4,998,593 | 3/1991 | Karnopp et al. | 180/140 |
| 5,048,633 | 9/1991 | Takehara et al. | 180/197 |
| 5,141,071 | 8/1992 | Edahiro et al. | 180/197 |
| 5,212,641 | 5/1993 | Iwata et al. | 364/424.05 |
| 5,222,570 | 6/1993 | Kawamura et al. | 180/197 |
| 5,248,010 | 9/1993 | Yagi et al. | 180/197 |
| 5,482,133 | 1/1996 | Iwata et al. | 180/197 |
| 5,488,555 | 1/1996 | Asgari et al. | 364/424.05 |

FOREIGN PATENT DOCUMENTS

| 2-252930 | 10/1990 | Japan . |
|---|---|---|
| 4-66359 | 3/1992 | Japan . |

*Primary Examiner*—Michael Zanelli
*Attorney, Agent, or Firm*—Keck, Mahin & Cate

[57] ABSTRACT

A traction control system for a motor vehicle has a four wheel steering device for controlling a steering characteristic of the vehicle based on a yaw rate difference between an actual yaw rate and a target yaw rate of the vehicle. The traction control system further has a device for controlling driven torque applied to a driven wheel while a slip is generated in the driven wheel. A correction device is used for correcting the driven torque to be small as a wheel steering angle becomes large while the four wheel steering device is operated.

17 Claims, 26 Drawing Sheets

FIG. 8

MAP 11

| | | VG | | | | | | | | |
|---|---|---|---|---|---|---|---|---|---|---|
| | | 0.00 | 0.05 | 0.10 | 0.15 | 0.20 | 0.25 | 0.30 | 0.35 | 0.40 |
| | 000 | 1.0 | 1.0 | 2.0 | 2.0 | 3.0 | 3.0 | 4.0 | 4.0 | 5.0 |
| | 020 | 1.0 | 1.0 | 2.0 | 2.0 | 3.0 | 4.0 | 4.0 | 5.0 | 5.0 |
| | 040 | 1.0 | 1.0 | 2.0 | 3.0 | 3.0 | 4.0 | 4.0 | 5.0 | 5.0 |
| Vr | 060 | 1.0 | 1.0 | 2.0 | 3.0 | 4.0 | 4.0 | 5.0 | 5.0 | 5.0 |
| | 080 | 1.0 | 1.0 | 2.0 | 3.0 | 4.0 | 5.0 | 5.0 | 5.0 | 5.0 |
| | 100 | 1.0 | 1.0 | 2.0 | 4.0 | 4.0 | 5.0 | 5.0 | 5.0 | 5.0 |
| | 120 | 1.0 | 2.0 | 3.0 | 4.0 | 5.0 | 5.0 | 5.0 | 5.0 | 5.0 |
| | 140 | 1.0 | 2.0 | 3.0 | 5.0 | 5.0 | 5.0 | 5.0 | 5.0 | 5.0 |

FIG. 9

MAP 12

| | | DEN | | | | | |
|---|---|---|---|---|---|---|---|
| | | (−) | | 0 | | (+) | |
| | (−) | PB | PB | PB | PB | PM | ZO | ZO |
| | | PM | PM | PM | PM | PS | ZO | ZO |
| EN | 0 | PM | PM | PM | PS | ZO | ZO | ZO |
| | | PS | PS | PS | ZO | ZO | ZO | ZO |
| | | ZO | ZO | ZO | ZO | NS | NS | NS |
| | | ZO | ZO | NS | NM | NM | NM | NM |
| | (+) | ZO | ZO | NM | NB | NB | NB | NB |

FIG. 10

MAP 13

| | | 0% THROTTLE OPENING 100% | | |
|---|---|---|---|---|
| | NER<3000rpm | 1.0 | 2.0 | 3.0 |
| NER | 3000rpm≦NER<3000rpm | 1.0 | 2.0 | 3.0 |
| | 5000rpm≦NER | 1.0 | 2.0 | 3.0 |

FIG.11

MAP 14

|  | DEN L | | | | | | |
|---|---|---|---|---|---|---|---|
|  | (−) | | | 0 | | (+) | |
| (−) | PB | PB | PB | PB | PM | ZO | ZO |
| | PM | PM | PM | PM | PS | ZO | ZO |
| EN L | PM | PM | PM | PS | ZO | ZO | ZO |
| 0 | PS | PS | PS | ZO | ZO | ZO | ZO |
| | ZO | ZO | ZO | ZO | NS | NS | NS |
| | ZO | ZO | NS | NM | NM | NM | NM |
| (+) | ZO | ZO | NM | NB | NB | NB | NB |

FIG.15

MAP 15

| $F_1$ | $F_2$ | $P_{SP}$ |
|---|---|---|
| 0 | 0 | 0 |
| 1 | 0 | 1 |
| 0 | 1 | 2 |
| 1 | 1 | 3 |

FIG.16

MAP 16

| $F_{SP}$ | | $P_{SP}$ | | | |
|---|---|---|---|---|---|
| | | 0 | 1 | 2 | 3 |
| $P'_{SP}$ | 0 | 0 | 1 | 1 | 0 |
| | 1 | 2 | 1 | 0 | 0 |
| | 2 | 2 | 0 | 1 | 0 |
| | 3 | 0 | 0 | 0 | 0 |

FIG.18

MAP 10

| ΔTR / θR | LARGE (5 ≤ ΔTR) | MIDDLE (2 ≤ ΔTR < 5) | SMALL (0 ≤ ΔTR < 2) |
|---|---|---|---|
| LARGE (2 ≤ θR) | | | AREA 14 |
| MIDDLE (0.5 ≤ θR < 2) | AREA 9 | AREA 11 | AREA 15 |
| SMALL (0 ≤ θR < 0.5) | AREA 10 | AREA 12 | AREA 0 |

FIG.19

MAP 1

| ΔTR | θR | AREA | USPA | USPB | KDRIVRE | KDRIVRB | BNHOSE | BPHOSE | EPHOSE | ENHOSE |
|---|---|---|---|---|---|---|---|---|---|---|
| < 2 | < 0.5 | 0 | 8.5 | 4.5 | 1.0 | 1.0 | 0 | 0 | 1.0 | 1.0 |
| ≦ 5 | ≧ 0.5 | 9 | 6.5 | 2.0 | 0.5 | 0.5 | 2 | 0 | 1.0 | 1.0 |
|  | < 0.5 | 10 | 6.5 | 2.0 | 0.7 | 0.7 | 2 | −1 | 1.0 | 1.0 |
| ≧ 2 | ≧ 0.5 | 11 | 6.5 | 2.0 | 0.7 | 0.7 | 2 | −1 | 1.0 | 1.0 |
|  | < 0.5 | 12 | 8.5 | 4.5 | 0.9 | 0.9 | 0 | 0 | 1.0 | 1.0 |
| < 2 | ≧ 2.0 | 14 | 6.5 | 2.0 | 0.7 | 0.7 | 2 | −1 | 1.0 | 1.0 |
|  | < 2.0 | 15 | 8.5 | 4.5 | 0.9 | 0.9 | 0 | 0 | 1.0 | 1.0 |

FIG.20

MAP 2

| ΔTR | θR | AREA | USPA | USPB | KDRIVRE | KDRIVRB | BNHOSE | BPHOSE | EPHOSE | ENHOSE |
|---|---|---|---|---|---|---|---|---|---|---|
| < 2 | < 0.5 | 0 | 8.5 | 4.5 | 1.2 | 1.0 | 0 | 0 | 2.0 | 0.8 |
| ≧ 5 | ≧ 0.5 | 9 | 6.5 | 2.0 | 0.7 | 0.5 | 2 | 0 | 2.0 | 0.8 |
| | < 0.5 | 10 | 6.5 | 2.0 | 0.9 | *0.6 | 2 | −1 | 2.0 | 0.8 |
| ≧ 2 | ≧ 0.5 | 11 | 6.5 | 2.0 | 0.9 | 0.7 | 2 | −1 | 2.0 | 0.8 |
| | < 0.5 | 12 | 8.5 | 4.5 | 1.1 | 0.9 | 0 | 0 | 2.0 | 0.8 |
| < 2 | ≧ 2.0 | 14 | 6.5 | 2.0 | 0.9 | 0.7 | 2 | −1 | 2.0 | 0.8 |
| | < 2.0 | 15 | 8.5 | 4.5 | 1.1 | 0.9 | 0 | 0 | 2.0 | 0.8 |

FIG. 21

MAP 3

| ΔTR | θR | AREA | USPA | USPB | KDRIVRE | KDRIVRB | BNHOSE | BPHOSE | EPHOSE | ENHOSE |
|---|---|---|---|---|---|---|---|---|---|---|
| < 2 | < 0.5 | 0 | 11.0 | 5.5 | 1.2 | 1.2 | 0 | 0 | 1.8 | 0.8 |
| ≥ 5 | ≥ 0.5 | 9 | 8.0 | 3.0 | 0.7 | 0.7 | 2 | 0 | 1.8 | 0.8 |
| | < 0.5 | 10 | 8.0 | 3.0 | 0.9 | 0.9 | 2 | −1 | 1.8 | 0.8 |
| ≥ 2 | ≥ 0.5 | 11 | 8.0 | 3.0 | 0.9 | 0.9 | 2 | 0 | 1.8 | 0.8 |
| | < 0.5 | 12 | 11.0 | 5.5 | 1.1 | 1.1 | 0 | −1 | 1.8 | 0.8 |
| < 2 | ≥ 2.0 | 14 | 8.0 | 3.0 | 0.9 | 0.9 | 2 | 0 | 1.8 | 0.8 |
| | < 2.0 | 15 | 11.0 | 5.5 | 1.1 | 1.1 | 0 | 0 | 1.8 | 0.8 |

FIG. 22

MAP 4

| ΔTR | θR | AREA | USPA | USPB | KDRIVRE | KDRIVRB | BNHOSE | BPHOSE | EPHOSE | ENHOSE |
|---|---|---|---|---|---|---|---|---|---|---|
| < 2 | < 0.5 | 0 | 8.5 | 4.5 | 1.2 | 1.0 | 0 | 0 | 2.0 | 0.8 |
| ≥ 5 | ≥ 0.5 | 9 | 6.5 | 2.0 | 0.7 | 0.5 | 2 | 0 | 2.0 | 0.8 |
| | < 0.5 | 10 | 6.5 | 2.0 | 0.9 | 0.7 | 2 | -1 | 2.0 | 0.8 |
| ≥ 2 | ≥ 0.5 | 11 | 6.5 | 2.0 | 0.9 | 0.7 | 2 | -1 | 2.0 | 0.8 |
| | < 0.5 | 12 | 8.5 | 4.5 | 1.1 | 0.9 | 0 | 0 | 2.0 | 0.8 |
| < 2 | ≥ 2.0 | 14 | 6.5 | 2.0 | 0.9 | *0.6 | 2 | -1 | 2.0 | 0.8 |
| | < 2.0 | 15 | 8.5 | 4.5 | 1.1 | 0.9 | 0 | 0 | 2.0 | 0.8 |

FIG. 23

MAP 5

| ΔTR | θR | AREA | USPA | USPB | KDRIVRE | KDRIVRB | BNHOSE | BPHOSE | EPHOSE | ENHOSE |
|---|---|---|---|---|---|---|---|---|---|---|
| <2 | <0.5 | 0 | 6.5 | 2.0 | 0.7 | 0.7 | 2 | -1 | 1.0 | 1.0 |
|  | <0.5 | 9 | 4.5 | 0.5 | 0.2 | 0.2 | 4 | -1 | 1.0 | 1.0 |
| ≤5 | <0.5 | 10 | 4.5 | 0.5 | 0.4 | 0.4 | 4 | -2 | 1.0 | 1.0 |
| ≥2 | ≤0.5 | 11 | 4.5 | 0.5 | 0.4 | 0.4 | 4 | -2 | 1.0 | 1.0 |
| ≥2 | <0.5 | 12 | 6.5 | 2.0 | 0.6 | 0.6 | 2 | -1 | 1.0 | 1.0 |
|  | ≥2.0 | 14 | 4.5 | 0.5 | 0.4 | 0.4 | 4 | -2 | 1.0 | 1.0 |
| <2 | <2.0 | 15 | 6.5 | 2.0 | 0.6 | 0.6 | 2 | -1 | 1.0 | 1.0 |

FIG. 24

MAP 17

| CONTROL AMOUNT | NB | NM | NS | ZO | PS | PM | PB |
|---|---|---|---|---|---|---|---|
| SPEED | −10 | −5 | −2 | 0 | +2 | +5 | +8 |

FIG. 28

MAP 18

| GEAR POSITION | NONDRIVEN WHEEL SPEED + TARGET SLIP AMOUNT STAO (km/h) | | | | | | | | | | |
|---|---|---|---|---|---|---|---|---|---|---|---|
| | | 0 | 10 | 20 | 30 | 40 | 50 | 60 | 70 | 80 | 90 | 100 |
| 1 | | 700 | 1500 | 2500 | 3500 | 4500 | 5500 | 3500 | 7500 | 8000 | 8000 | 8000 |
| 2 | | 600 | 1200 | 1700 | 2200 | 2700 | 3200 | 3700 | 4200 | 4700 | 5200 | 5700 |
| 3 | | 600 | 1000 | 1500 | 2000 | 2500 | 3000 | 3500 | 4000 | 4500 | 5000 | 5500 |
| 4 | | 550 | 700 | 1200 | 1700 | 2200 | 2700 | 3200 | 3700 | 4200 | 4700 | 5200 |

TRACTION CONTROL SYSTEM FOR MOTOR VEHICLE

BACKGROUND OF THE INVENTION

1. Field of the Invention

The present invention relates to a traction control system or a slip control system of a motor vehicle, in particular to a traction control system which is applied a motor vehicle having a four-wheel steering system (4WS) which steers rear wheels based on vehicle driving conditions such as a vehicle speed, a front wheel steering angle and a yaw rate.

There is known a conventional traction control system for a motor vehicle which prevents a decrease in acceleration ability caused by the slip which is caused by an excessive driving torque of the driven wheel in an accelerating operation and the like. In order to do so, such slip control system detects a slip value of the driven wheel and controls an engine output and braking force so that the slip value of the driven wheel becomes less than a target slip value which is provided based on friction coefficient of the road surface. The engine output is decreased by the engine output control and the braking force is increased by the braking force control. In the engine output control, a throttle opening in a throttle valve of an engine is controlled. Such conventional traction control system for the motor vehicle is disclosed in for example Japanese Patent Laid-Open No. 2-252930 and Japanese Patent Laid-Open No. 3-109161.

On the other hand, there is known a four-wheel steering system (4WS) which steers rear wheels based on a difference between a target yaw rate and an actual yaw rate of the motor vehicle.

In such four-wheel steering system, the yaw rate increases based on driving conditions of the motor vehicle. The reason why the yaw rate increases may be considered as follows. That is, firstly, the vehicle has an over-steering condition since road surface friction coefficient μ is small and therefore a necessary cornering force of the rear wheels cannot be established by a steering operation of rear wheels. Secondly, the front engine rear drive vehicle (FR vehicle) has an over-steering condition since the FR vehicle has a high slip ratio in rear wheels and therefore a necessary cornering force of the rear wheels cannot be established. On the other hand, the rear wheel steering angle increases based on driving conditions of the motor vehicle. The reason why the rear wheel steering angle may be considered as follows. That is, the vehicle has an over-steering condition since a necessary cornering force of the rear wheels cannot be established when the rear wheel steering angle has the same phase as the front wheel steering angle during the vehicle traveling in a corner.

As a result, under the above-mentioned three driving conditions, when the engine output is decreased and/or the braking force of the wheels is increased by the traction control system independently from the four-wheel steering system, the above-mentioned driving conditions are enhanced and therefore it becomes difficult to keep both of stability and steering ability of the vehicle in good conditions.

How to control cooperatively the traction control system and the four-wheel steering system is not so well known such that only Japanese Patent Laid-Open No. 4-66359, and therefore there are many unsolved problems.

SUMMARY OF THE INVENTION

It is therefore an object of the present invention to provide a slip control system for a motor vehicle which can obtain both of stability and acceleration ability of the vehicle.

It is another object of the present invention to provide a slip control system for a motor vehicle which can obtain both of stability and acceleration ability when the vehicle is traveling on a rough road.

These and other objects are achieved according to the present invention by providing a traction control system for a motor vehicle comprising, steering characteristic control means for controlling steering characteristic of the vehicle based on a yaw rate difference between an actual yaw rate and a target yaw rate of the vehicle, driven torque control means for controlling driven torque applied to a driven wheel while a slip is been generated in the driven wheel, and driven torque correction means for correcting the driven torque to be small as a wheel steering angle becomes large while said steering characteristic control means is been operated.

These and other objects are also achieved according to the present invention by providing a traction control system for a motor vehicle comprising, steering characteristic control means for controlling steering characteristic of the vehicle based on a yaw rate difference between an actual yaw rate and a target yaw rate of the vehicle, driven torque control means for controlling driven torque applied to a driven wheel while a slip is been generated in the driven wheel, rough road determination means for determining a rough road, rough road correction means for correcting the driven torque so that the vehicle becomes stable when the rough road is determined, and rough road correction changing means for changing the corrected driven torque to be small when the rough road is determined and both of a wheel steering angle and the yaw rate difference are equal to or greater than predetermined values while said steering characteristic control means is been operated.

The above and other objects and features of the present invention will be apparent from the following description by taking reference with accompanying drawings employed for preferred embodiments of the present invention.

BRIEF DESCRIPTION OF THE DRAWINGS

In the accompanying drawings:

FIG. 8 is MAP 11 for estimating road surface friction coefficient μ;

FIG. 9 is MAP 12 for providing a basic control amount in throttle opening;

FIG. 10 is MAP 13 for providing a correction coefficient $T_G$ of the basic control amount in throttle opening;

FIG. 11 is MAP 14 for providing a basic control amount in braking force;

FIG. 15 is MAP 15 showing an example of a spin pattern map which is used in the determination of the split road surface shown in FIG. 14;

FIG. 16 is MAP 16 showing an example of a split determination map which is used in the determination of the split road surface shown in FIG. 14;

FIG. 18 is MAP10 showing a relationship between respective AREA0, AREA9, AREA10, AREA11, AREA12, AREA14 and AREA15 in MAP1 through MAP5, and a rear wheel steering angle and a difference between a target yaw rate and an actual yaw rate;

FIG. 19 is MAP1 which is a control map for a stable condition;

FIG. 20 is MAP2 which is a control map for a split road surface in a normal condition;

FIG. 21 is MAP3 which is a control map for a rough road in a normal condition;

FIG. 22 is MAP4 which is a control map for a split road surface where a steering wheel angle is large;

FIG. 23 is MAP5 which is a control map for a rough road where a road surface friction coefficient μ is low;

FIG. 24 is MAP17 for providing a valve operation speed in a subthrottle valve;

FIG. 28 is MAP18 showing lowest value of an engine speed in an engine control;

DESCRIPTION OF THE PREFERRED EMBODIMENTS

The present invention will now be explained with reference to the preferred embodiments and the drawings.

Figure 1:
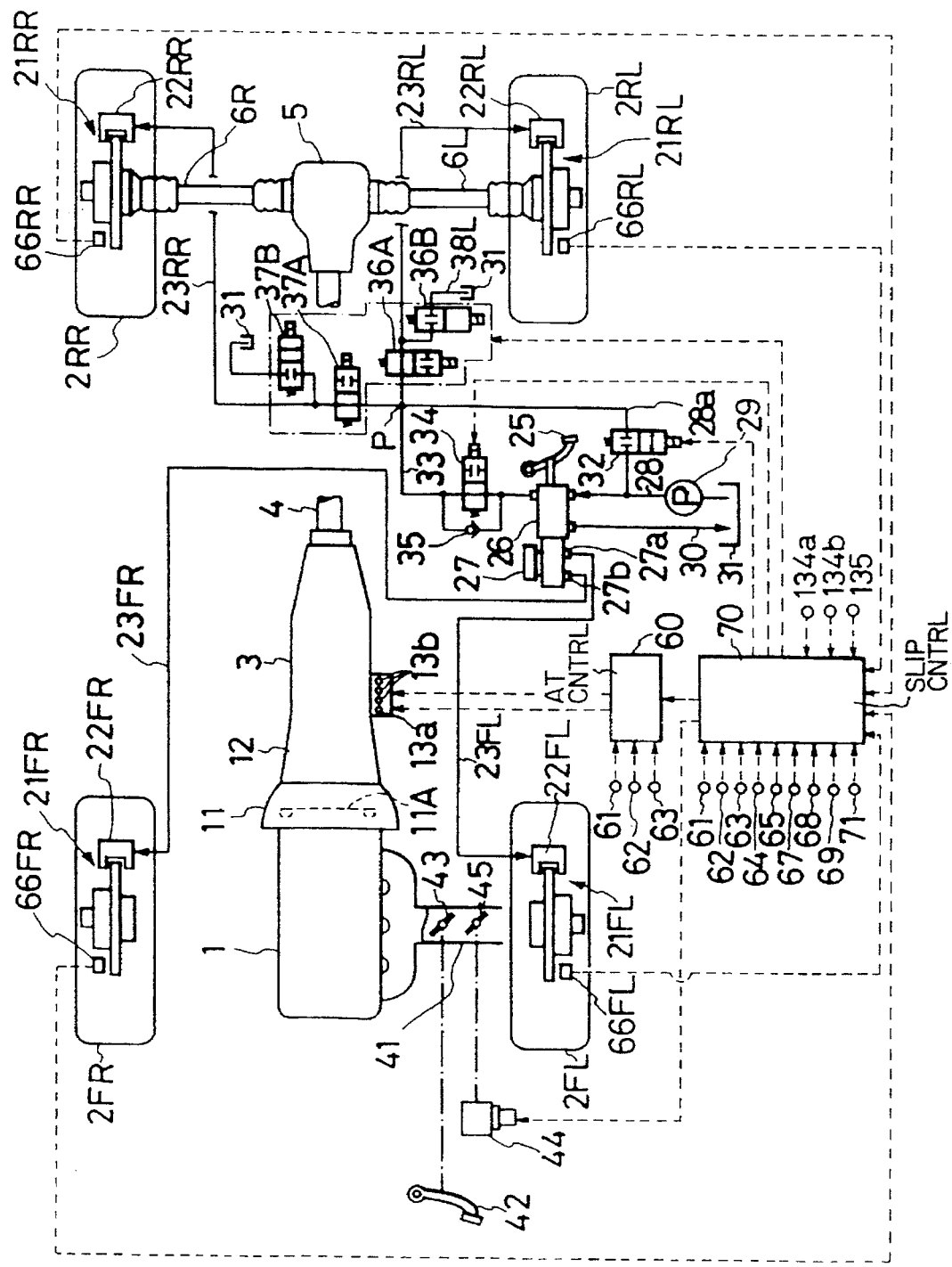
FIG. 1 is a general diagram of a motor vehicle to which a traction control system of the present invention is applied.

FIG. 1 is a general diagram of a motor vehicle to which a traction control system of the present invention is applied. In FIG. 1, a four-wheel steering system is not shown so as to understand the embodiment easily.

Referring to FIG. 1, there is shown a motor vehicle having right and left front wheels 1FR, 1FL for nondriven wheels, right and left rear wheels 1RR, 1RL for driven wheels, and a slip control unit 70 which carries out a brake control and an engine control for controlling the slip values in the driven wheels 1RR, 1RL, and which also carries out a lockup control through an automatic transmission controller 60.

The vehicle includes an engine 1 disposed in the front portion thereof. A torque generated by the engine 1 is transmitted to the right rear wheel 2RR through an automatic transmission 3, a propeller shaft 4, a differential gear 5 and a right diving shaft 6R and transmitted to the left rear wheel 2RL through the automatic transmission 3, the propeller shaft 4, the differential gear 5 and a left diving shaft 6L.

The automatic transmission 3 comprises a fluid torque converter 11 and a multiple-stage transmission gear mechanism 12. The transmission gear mechanism 12 is operated by hydraulic pressure and includes four forward stages and one backward stage. That is, the transmission gear mechanism 12 is operated by selecting combinations of magnetization and/or demagnetization of a plurality of solenoids 13a which are incorporated in a hydraulic control circuit for the automatic transmission 3. The torque converter 11 is provided with a lockup clutch 11a operated by hydraulic pressure whose connection and disconnection is carried out by selecting magnetization or demagnetization of a solenoid 13b incorporated in the hydraulic control circuit.

The solenoids 13a, 13b are controlled by the AT controller 60 for the automatic transmission 3. The AT controller stores transmission characteristics and lockup characteristics and in accordance with these characteristics carries out the transmission and lockup controls. In order to carry out these control operations, a main throttle opening signal from a main throttle sensor 61 detecting an opening of a main throttle valve 43, a sub throttle opening signal from a sub throttle sensor 62 detecting an opening of a sub throttle valve 45, and a vehicle speed signal from a vehicle speed sensor 63 detecting a rotation speed of the propeller shaft 4 are input to the AT controller 60.

Brake Fluid Pressure Adjustment Mechanism

Brakes 21FR, 21FL, 21RR and 2RL are provided respectively in wheels 1FR, 1FL, 1RR and 1RL. Brake fluid pressure is supplied to respective calipers (wheel cylinders) 22FR, 22FL, 22RR and 22RL of the brakes 21FR, 21FL, 21RR and 21RL through respective brake conduits 23FR, 23FL, 23RR and 23RL. The calipers 22RR, 22RL in the driven wheels 2RR, 2RL are respectively provided with brake pressure sensors 64, 64 estimating the brake pressure therein.

Supply of the brake fluid pressure to the respective brakes 21FR, 21FL, 21RR and 21RL is carried out as follows. First, braking force on a brake pedal 25 is boosted by a hydraulic booster 26 and transmitted to a tandem type cylinder 27. A first discharge outlet 27a of the master cylinder 27 is connected to the brake conduit 23FL for the left front wheel, and a second discharge outlet 27b of the cylinder 27 is connected to the brake conduit 23FR for the right front wheel.

Fluid is supplied through a conduit 28 by a pump 29 to the booster 26, and the excessive fluid in the booster 26 is returned back to a reservoir 31 through a conduit 30. A branch conduit 28a is branched from the conduit 28 is connected to a junction point P and provided with a solenoid switching valve 32. The boosted fluid pressure in the booster 26 is supplied to the junction point P through a conduit 33 with a solenoid switching valve 34. The conduit 33 is further provided in parallel to the switching valve 34 with a one way valve 35 which permits the fluid to flow toward the junction point P. To the junction point P, the brake conduits 23RR, 23RL are connected. The brake conduits 23RR, 23RL are respectively provided with solenoid switching valves 37A, 36B and further provided with solenoid switching valves 37B, 36B on relief conduits 38R, 38L connected to the down stream portion of the switching valves 37A, 36A.

The above-mentioned respective switching valves 32, 34, 36A, 37A, 36B and 37B are controlled by the slip control unit 70. Namely, when the brake control operation for the slip control is not carried out, as shown in FIG. 1, the switching valve 32 is closed and the switching valve 34 is opened, and further the switching valves 36A, 36B are opened and the switching valves 36B, 37B are closed. As a result, when the brake pedal 25 is operated, the brake fluid pressure is supplied to the brakes 21FR, 21FL for the front wheels 1FR, 1FL through the master cylinder 27 and is supplied to the brakes 21RR, 21RL for the rear wheels 1RR, 1RL through the conduit 33 of the booster 26 in accordance with the operational force on the brake pedal 25.

When the brake control operation for the slip control explained below is carried out, the switching valve 34 is closed and the switching valve 32 is opened. A duty control on the switching valves 36A, 36B (37A, 37B) are carried out so as to maintain, increase or decrease the brake fluid pressure. Namely, under the condition of the switching valve 32 being closed, the brake fluid pressure is maintained by the switching valves 36A, 36B, 37A and 37B being closed, and is increased by the switching valve 36A (37A) being opened and the switching valve 36B (37B) being closed, and is decreased by the switching valve 36A (37A) being closed and the switching valve 36B (37B) being opened. The one way valve 35 is provided so that the brake fluid pressure from the branch conduit 28a does not work as a reaction force to the brake pedal 25.

When the brake control operation for the slip control is being carried out and then the brake pedal 25 is operated, the brake fluid pressure of the booster 26 corresponding to the operational force on the brake pedal 25 is supplied through the one way valve 35 to the brakes 21RR, 21RL for the rear wheels 1RR, 1RL.

Engine Output Adjustment Mechanism

The slip control unit 70 carries out not only the brake control operation by which the driving torque applied to the driven or rear wheels 2RR, 2RL is decreased, but also the engine control operation by which the torque generated by the engine 1 is decreased. For the engine control, in an intake passage 41 is disposed a main throttle valve 43 operatively connected to an accelerator pedal 42 and a sub throttle valve 45 operatively connected to an actuator 44 for adjusting an throttle opening. The sub throttle valve 45 is controlled by the slip control unit 70 through the actuator 44. In this case, because the main throttle valve 43 and the sub throttle valve 45 are disposed in series, the throttle opening is determined by whichever throttle valve is opened least.

Four-Wheel Steering System (4WS)

Figure 2:
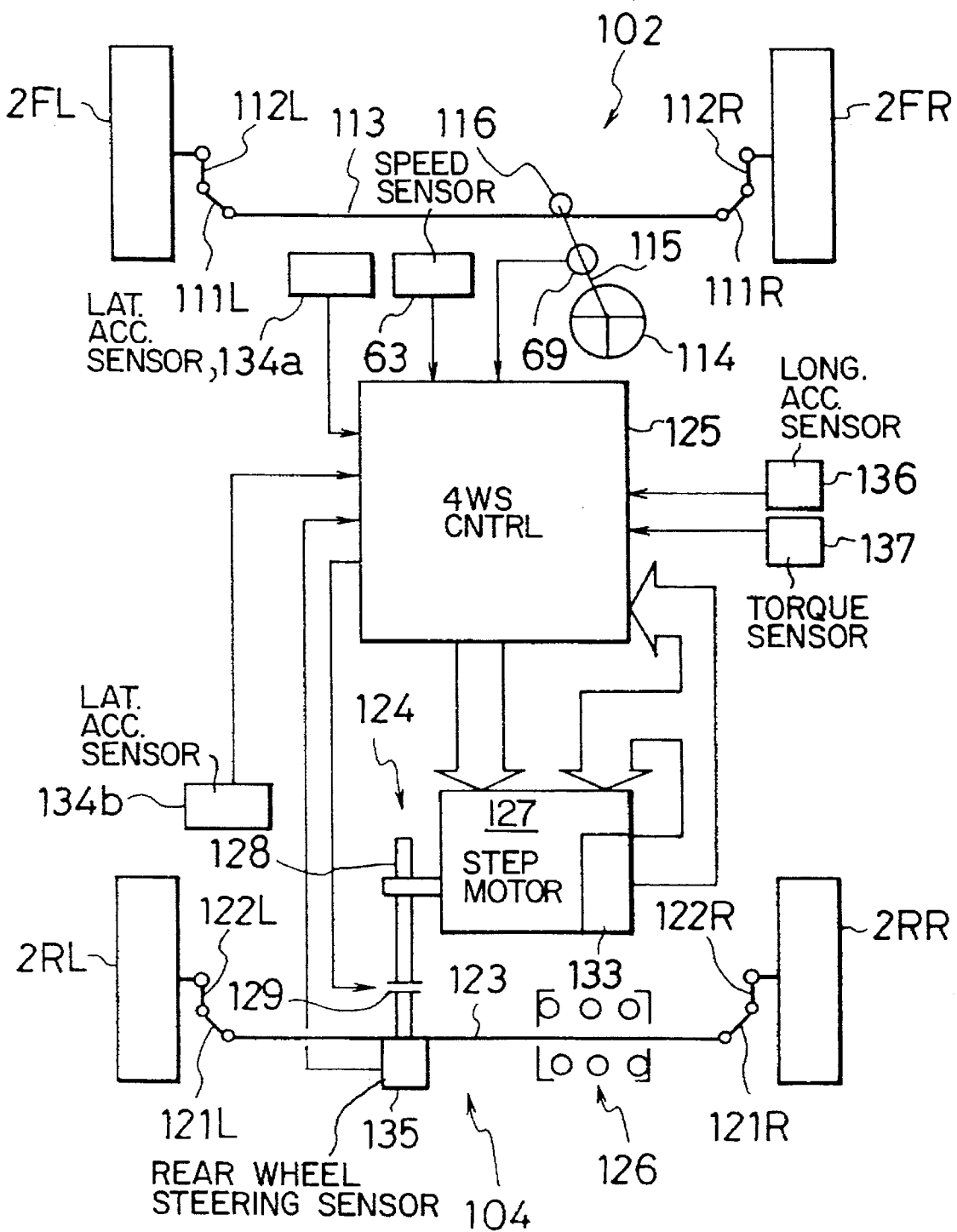
FIG. 2 is a general diagram of a motor vehicle having a four-wheel steering system to which the present invention is applied.

FIG. 2 is a general diagram of a motor vehicle having a four-wheel steering system to which the present invention is applied. Referring to FIG. 2, the vehicle is provided with a front wheel steering device 102 for steering the front wheels 2FR and 2FL and a rear wheel steering device 104 for steering the rear wheels 2RR and 2RL.

The front wheel steering device 102 is provided in a vehicle width direction and includes a relay rod 113 connected at both ends thereof to the front wheels 2FR and 2FL through respective tie rods 111R and 111L and knuckle arms 112R and 112L, a steering shaft 115 to which a steering wheel 114 is connected, and a rack-and-pinion 116 for converting an rotation of the steering shaft 115 to a movement in the vehicle width direction of the relay rod 113. In the front wheel steering device 102, an operation of the steering wheel 114 makes the relay rod 113 move in the width direction and then the front wheels 2FR and 2FL are steered.

The rear wheel steering device 104 is also provided in a vehicle width direction and includes a relay rod 123 connected at both ends thereof to the rear wheels 2RR and 2RL through respective tie rods 121R and 121L and knuckle arms 122R and 122L, a drive device 124 for moving the relay rod 123 in an axial or a vehicle width direction, a 4WS controller 125, and a neutral position returning device 126 with a spring and the like for maintaining the relay rod 123 at a neutral position, which is a position at which the rear wheel steering angle is zero and the vehicle is traveling straight, when the drive device 124 and/or the 4WS controller is out of order.

The drive device 124 includes a step motor 127 able to rotate in both direction, a drive force transmitting mechanism 128 for transmitting a rotation drive force of the step motor 127 to the relay rod 123, and a clutch 129 provided in the drive force transmitting mechanism 128. When the clutch 129 is connected, the positive or negative rotation of the step motor 127 makes the relay rod 123 move in the width direction and then the rear wheels 2RR and 2RL are steered.

The 4WS controller 125 controls steering angles of the rear wheels 2RR and 2RL by operating the step motor 127 and the clutch 129. The 4WS controller 125 receives various detection signals from a steering wheel sensor 69 for detecting a steering angle of the steering wheel 114, a vehicle speed sensor 63 for detecting a vehicle speed, an encoder 133 for detecting a rotation position of the step motor 127, a pair of lateral acceleration sensors 134a and 134b provided in a front portion and a rear portion of the vehicle for detecting lateral accelerations of the vehicle body, a rear wheel steering sensor 135 for detecting a steering angle of the rear wheels 2RR and 2RL based on a width direction of the relay rod 123, a longitudinal acceleration sensor 136 for detecting a longitudinal acceleration of the vehicle body, a torque sensor 137 for detecting a self-aligning torque applied to the front wheels 2FR and 2FL, and the like. The torque sensor 137 detects the self-aligning torque based on a torsion force applied to strut members in a front suspension device.

Figure 3:
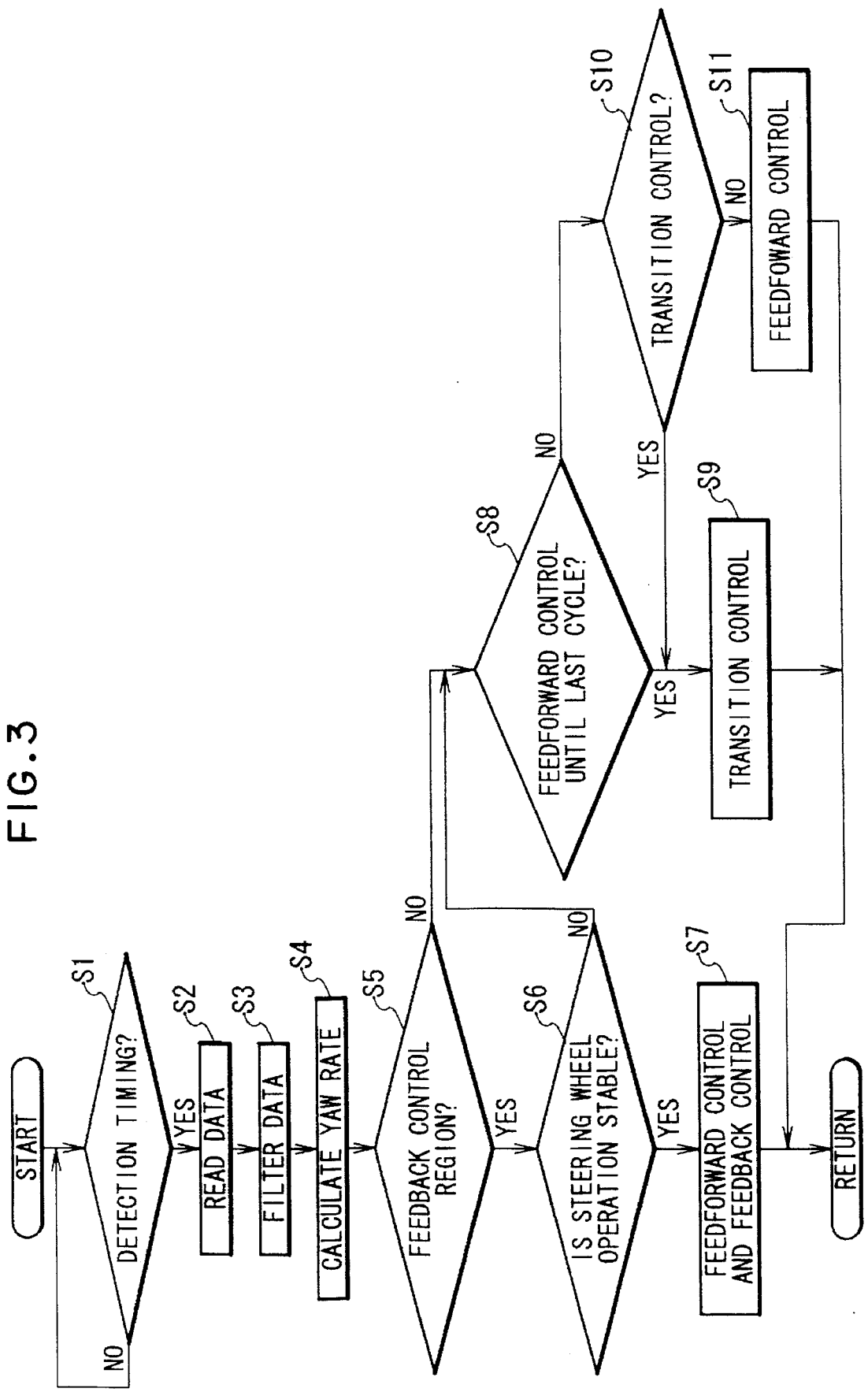
FIG. 3 is a flow chart showing a way how to control rear wheels by the four-wheel steering system which is shown in FIG. 2.

FIG. 3 is a flow chart showing a way how to control rear wheels by the 4WS controller 125 in the four-wheel steering system.

Referring to FIG. 3, it is determined whether or not a present time is a detection timing in step S1, and data from various sensors 131–137 are read in step S2. Then, the data are filtered in step S3 and a vehicle turning condition is obtained in step S4. The vehicle turning condition is a yaw rate which is a angle speed of the vehicle around a vertical axis and is obtained by the lateral acceleration sensors 134a and 134b.

Thereafter, it is determined whether or not the present vehicle turning condition is in a region where a feedback control can be carried out in step S5. If the answer is YES in step S5, it is determined whether or not a steering wheel operation of the driver is stable in step S6. If the answer is YES in step S6, both of a feedback control and a feedforward control are carried out in parallel in step S7.

If the answer is NO in step S6 or step S7, it is determined whether or not a feedforward control had been carried out until the last cycle in step S8. If the answer is YES in step S8, a transition control is carried out in step S9. If the answer is NO in step S8, it is determined whether or not a transition control has been carried out in step 10, and a feedforward control is only carried out in step S11 after stopping the feedback control when the answer is NO in step S10.

Figure 4:
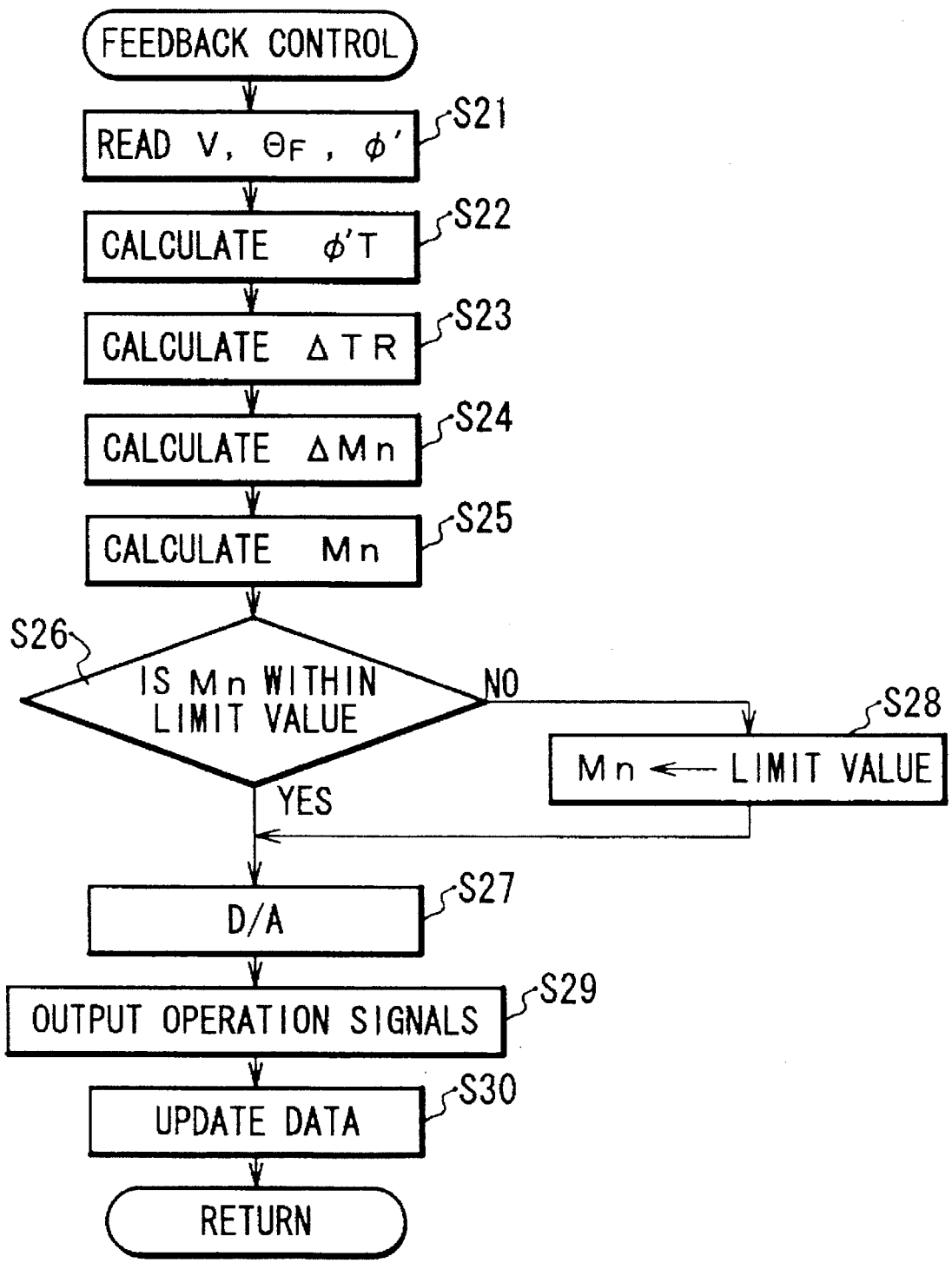
FIG. 4 is a flow chart showing a feedback control in the flow chart shown in FIG. 3.

FIG. 4 is a flow chart showing a subroutine of the feedback control in step S7 in FIG. 3.

Referring to FIG. 4, a vehicle speed Vr, a steering wheel angle $\theta_H$ and a yaw rate $\phi'$ are read in step S21, and a target yaw rate $\phi'T$ is calculated in step S22. The target yaw rate $\phi'T$ is obtained by a following equation:

$$\phi'T = V \cdot \theta_H / (1 + A \cdot Vr^2) \cdot L \tag{1}$$

where A is a stability factor and L is a wheel base.

Next, a yaw rate difference delta TR (=$\Phi'$−$\Phi'$T) between an actual yaw rate $\Phi'$ and a target yaw rate $\Phi'$T is calculated in step S23, and then a change amount delta Mn in a rear wheel steering operation is calculated based on the yaw rate difference delta TR in step S24. The change amount delta Mn is obtained by a following equation:

$$\text{Delta } Mn = Ki \cdot \text{deltaTR} - Kp \cdot (\phi' - \phi'T_1) - Kd \cdot (\phi' - 2\phi'_1 + \phi'_2) \tag{2}$$

where $\phi'$ is a current yaw rate, $\phi'_1$ is a yaw rate of one cycle before and $\phi'_2$ is a yaw rate of two cycles before, Ki is an integration constant, Kp is a proportional constant and Kd is a differential constant.

Next, an output amount Mn in a rear wheel steering operation is calculated by adding the change amount delta Mn to the output amount $Mn_1$ of the last cycle in step S25. That is, $Mn = Mn_1 + \text{delta } Mn$. Then, it is determined in step S26 whether or not the output amount Mn is within a predetermined value. The procedure proceeds to step S27 when the answer is YES in step S26, and the procedure proceeds to step S28 in which the limit value is set as the output amount Mn when the answer is NO in step S26. D/A output conversion is carried out in step S27, and an operation signal is output in step S29. The data is updated in step S30, that is, $\phi'_1$, $\phi'$ and Mn are respectively updated to $\phi'_2$, $\phi'_1$ and $Mn_1$.

Slip Control Unit

To the slip control unit 70 is input Signals of throttle opening sensors 61, 62 and a vehicle speed sensor 63 are input to the slip control unit 70. In addition, various other signals are input to the slip control unit 70, such as those of brake fluid pressure sensors 64, 65 detecting respective brake fluid pressures in the driven wheels 2RR, 2RL, those of wheel rotation speed sensors 66FR, 66FL, 66RR and 66RL detecting respective wheel rotation speeds in the wheels 2FR, 2FL, 2RR and 2RL, that of an acceleration opening sensor 67 detecting the acceleration pedal operational amount, that of an gear position sensor 68 detecting the gear position in the automatic transmission, that of an steering angle sensor 69 detecting the steering angle of a steering wheel, and that of a manual selection switch 71 by which various modes are selected manually by a driver. Further, a yaw rate signal of the lateral acceleration sensors 134a and 134b and a rear wheel steering angle signal of the rear wheel steering angle detection sensor 135 are input to the slip control unit 70.

The slip control unit 70 is provided with an input interface for receiving the signals from each of the above sensors, a microcomputer having a CPU, a ROM and a RAM, an output interface, and a drive circuit for driving the valves 32, 34, 36A, 36B, 37A, 37B and the actuator 44. Programs necessary for the slip control and various maps are stored in the ROM. Various memories necessary for the slip control are stored in the RAM.

Figure 5:
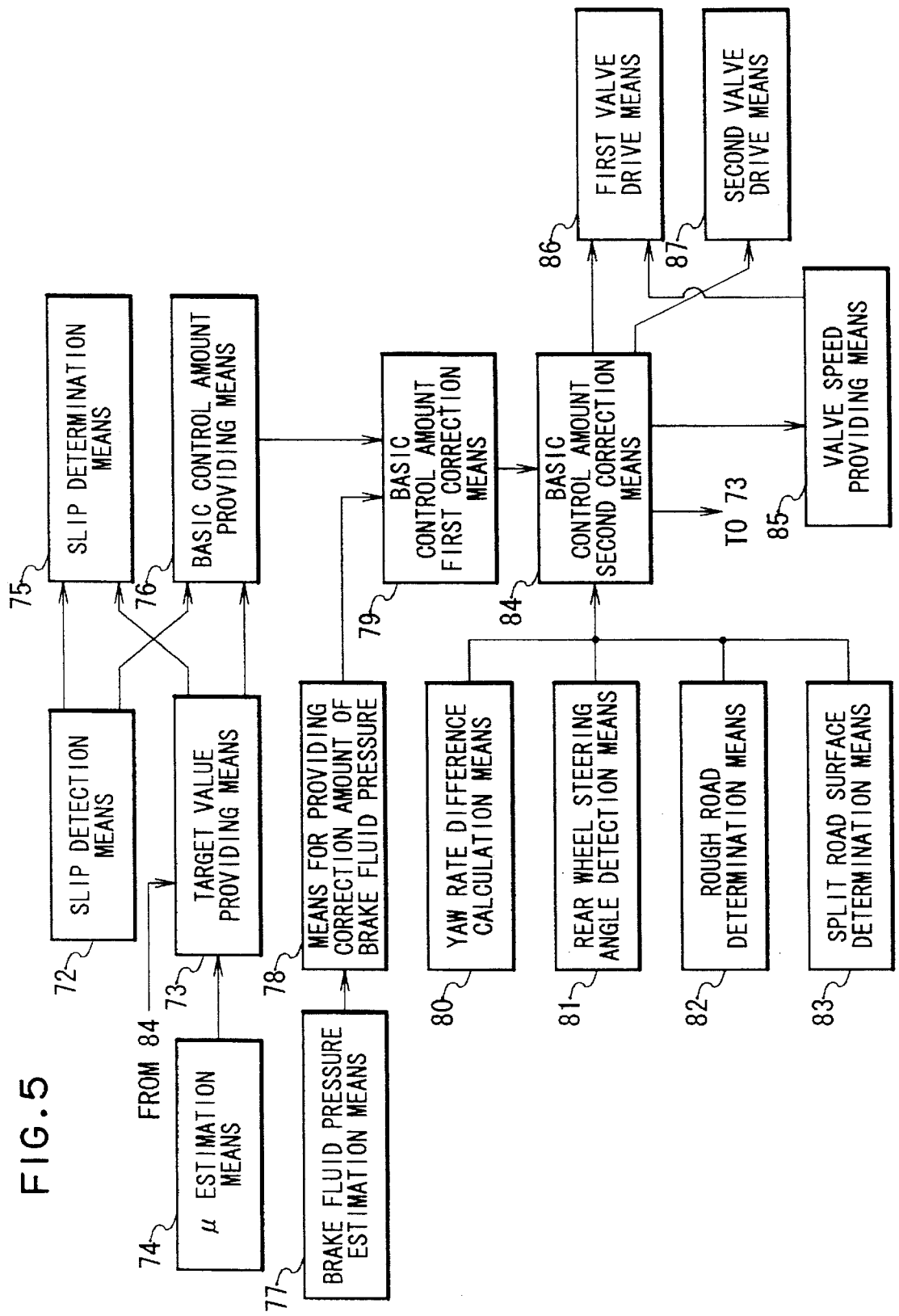
FIG. 5 is a block diagram showing an traction control system in accordance with an embodiment of the present invention.

Referring to FIG. 5, the slip control unit 70 is provided with a slip detection means 72, a target value providing means 73 for providing a target slip valve or a threshold of slip value, a road surface friction coefficient μ estimation means 74, a slip determination means 75, a basic control amount providing means 76, a brake fluid pressure estimation means 77 for estimating respective brake fluid pressures in the driven wheels 2RR, 2RL, a means 78 for providing a correction amount of brake fluid pressure by converting brake fluid pressure into throttle opening, a basic control amount first correcting means 79, a yaw rate calculation means 80 for calculating a yaw rate difference, a rear wheel steering angle detection means 81 for detecting a rear wheel steering angle, a rough road determination means 82 for determining a rough road, a split road surface determination means 83 for determining a split road surface, a basic control amount second correction means 84, a valve speed providing means 85 of the subthrottle 45, a first valve drive means 86 for driving the actuator 44, and a second valve drive means 87 for driving the valves 32, 36A, 37A, 36B and 37B.

Slip Detection Means 72

Slip values in the driven wheels are detected by using the signals sent from the wheel rotation speed sensors 66FR, 66FL, 66RR and 66RL. Namely, the slip detection means 72 detects the slip value S by subtracting the wheel rotation speed of the nondriven wheel from the wheel rotation speed of the driven wheel. In detecting the slip value S, the larger one of the driven wheel rotation speeds in the right and left driven wheels are employed as the driven wheel rotation speed, and the average of the nondriven wheel rotation speeds in the nondriven wheels are employed as the nondriven wheel rotation speed in the engine control. On the other hand, in the brake control, the same value as that in the engine control is employed as the nondriven wheel rotation speed, and respective driven wheel rotation speeds are employed so that respective brake fluid pressures in the driven wheels are controlled independently each other.

Target Value Providing Means 73

Figure 6:
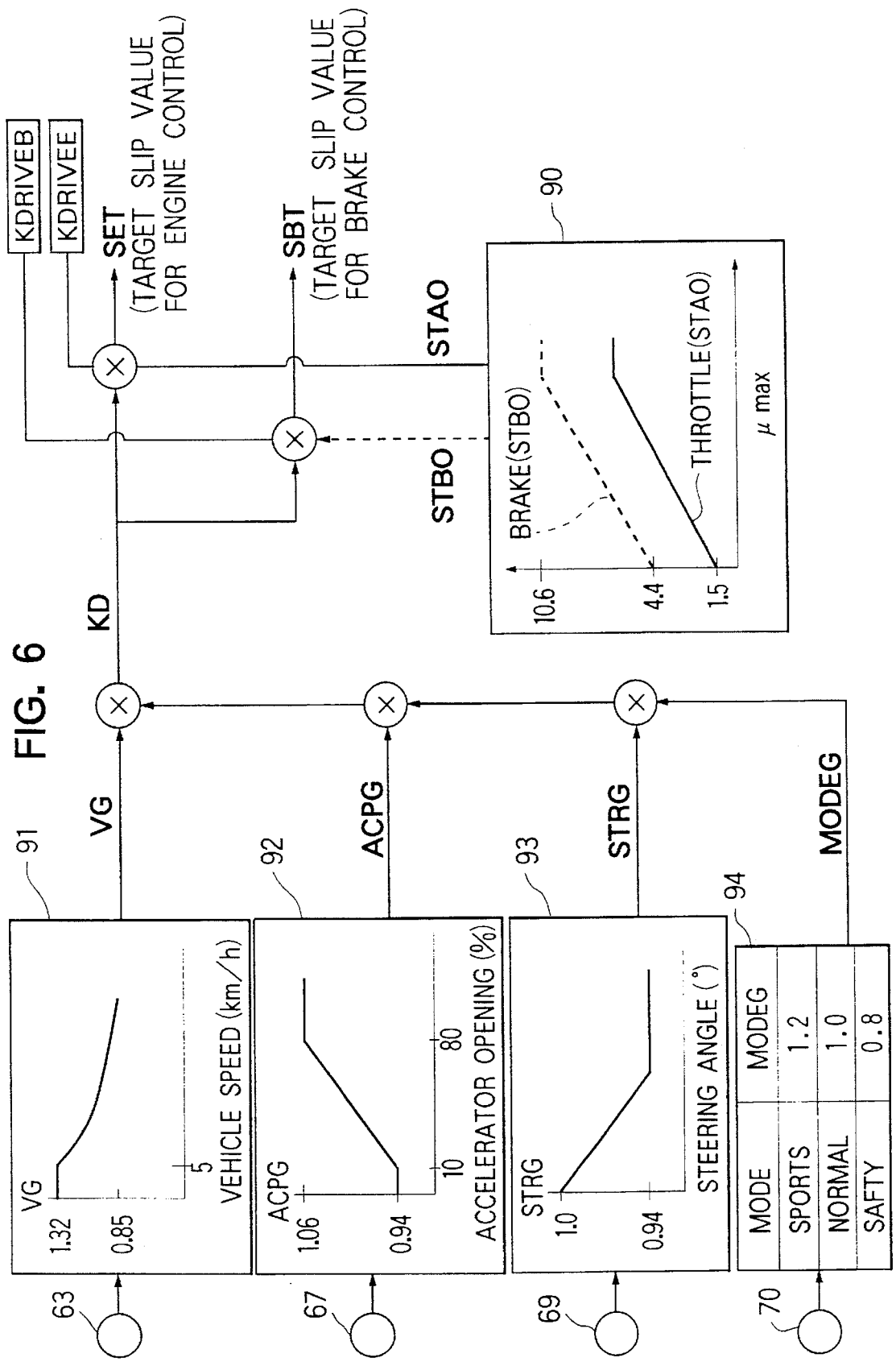
FIG. 6 is a circuit diagram for determining respective target slip values for a brake control and an engine control.

FIG. 6 is a block diagram showing a circuit for determining a target slip value SET for the engine control and a target slip value SB for the brake control. These target slip values SET, SBT are determined by parameters such as a vehicle speed, an accelerator operational amount, a steering angle of the steering wheel, a mode selected by the manual selection switch 71, road surface friction coefficient μ and correction coefficients KDRIVEE and KDRIVEB. The target slip value SBT for the brake control is greater than the target slip value SET for the engine control.

Referring to FIG. 6, a basic value STAO of the target slip value SET and a basic value STBO of the target slip value SBT are stored respectively in a map 90 whose parameter is the road surface friction coefficient μ. In the map 90, the larger the friction coefficient μ becomes, the larger the both of STAO and STBO becomes, where STBO is greater than STAO. The target slip values SET and SBT are obtained respectively by multiplying the basic values STAO, STBO by a correction gain KD and correction coefficients KDRIVEE and KDRIVEB.

The correction gain KD is obtained by multiplying a gain coefficient VG by gain coefficients ACPG, STRG and MODEG. The gain coefficient VG is provided so as to obtain the stability of the vehicle in accordance with the increase of the vehicle speed and is given by a map 91 as a function of the vehicle speed. The gain coefficient ACPG is provided so as to obtain the driving force in accordance with the acceleration demand of the driver and is given by a map 92 as a function of the accelerator opening. The gain coefficient STRG is provided so as to obtain the stability of the vehicle in the steering operation and is given by a map 93 as a function of the steering angle. The gain coefficient MODEG is given by a table 94 and is manually selected from three modes i.e. SPORTS MODE, NORMAL MODE and SAFETY MODE by the driver.

The correction coefficients KDRIVEE and KDRIVEB are obtained by MAPs 1–5 (see FIGS. 19–23) which are explained below.

Figure 7:
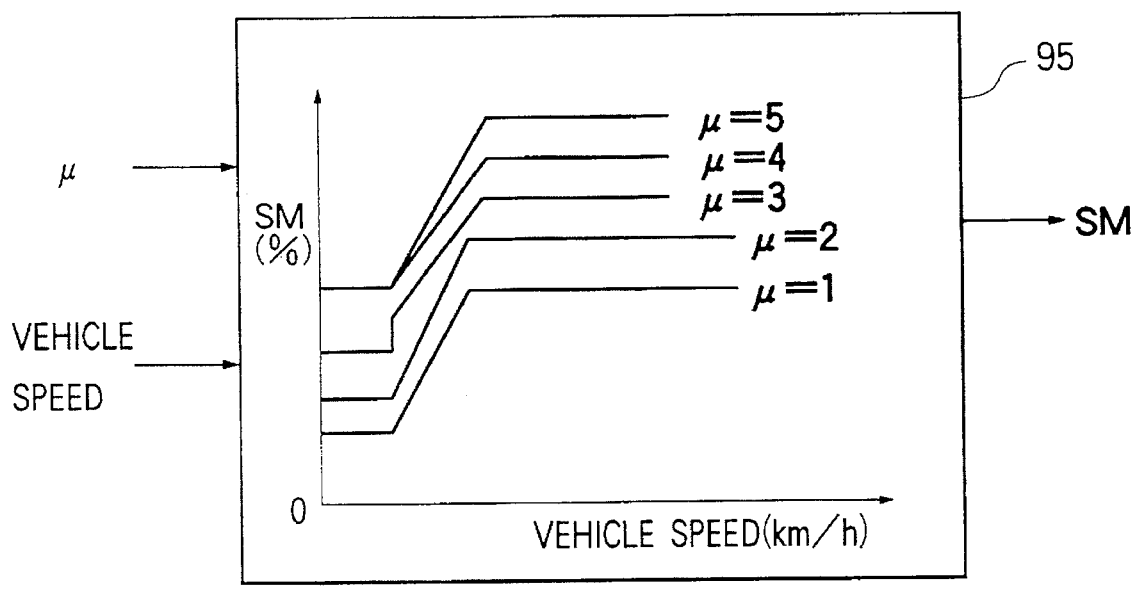
FIG. 7 is a map for determining a lower limit control value SM in the traction control.

Referring to FIG. 7, a lower limit control value SM of the throttle opening is stored in a map 95 whose parameters are vehicle speed and road surface friction coefficient μ. The friction coefficient μ varies from 1 to 5 where the smallest is equal to 1 and the largest is equal to 5.

μ Estimation Means 74

The road surface friction coefficient μ which is a friction coefficient between the road surface and the wheel is determined based on the vehicle speed Vr and the vehicle acceleration VG.

The vehicle acceleration VG is determined by using timer A counting a time every 100 millisecond and a timer B counting a time every 500 millisecond. Namely, by using an following equation (3), the vehicle acceleration VG is determined every 100 millisecond based on the difference between the present vehicle speed and the 100 millisecond previous vehicle speed in which the larger wheel rotation speed of the front wheels 2FR, 2FL is employed as the vehicle speed whose unit is km/h, when the vehicle acceleration has not been developed enough or from the starting point of the slip control operation to a time at which 500 millisecond has passed from the starting point of the slip control operation. When the vehicle acceleration has been developed enough or after 500 millisecond has passed from the starting point of the slip control operation, the vehicle acceleration VG is determined every 100 millisecond based on the difference between the present vehicle speed and the 500 millisecond previous vehicle speed by using a following equation (4).

$$VG = Gk1 \cdot \{Vr(k) - Vr(k-100)\} \quad (3)$$

$$VG = Gk2 \cdot \{Vr(k) - Vr(k-500)\} \quad (4)$$

where Gk1 and Gk2 are respectively coefficients, and Vr(k), Vr(k−100) and Vr(k−500) are respectively vehicle speeds at a present time, 100 millisecond previous time and 500 millisecond previous time.

Then the road surface friction coefficient μ is finally determined based on the above-mentioned vehicle acceleration VG and vehicle speed Vr by using MAP11 shown in FIG. 8.

Slip Determining Means 75

The slip determining means 75 employs the slip value S detected by the slip detecting means 72 and the target slip values SET, SBT. The slip determining means 75 sets a control flag as F=1 which means the engine control operation should be carried out where the slip value S is greater than SET, and sets the control flag as F=0 where the condition of the slip value S being equal to or less than SET has continued for a predetermined time. On the other hand, the slip determining means 75 determines that the brake control is necessary to be carried out when the slip value S is greater than SBT.

USPA and UPPB are thresholds for starting an engine control for a slip control and USPA has a greater value than UPPB. When a slip value becomes greater than USPA, a throttle valve opening is decreased to a lower limit control value SM by a feedforward control (see FIGS. 7 and 30). When a slip value becomes greater than UPPB, a throttle valve opening is operated by a feedback control so that the slip value becomes equal to a target slip amount SET.

Basic Control Amount Providing Means 76

The basic control amount providing means 76 provides throttle opening control amount in the sub throttle valve 45 in the engine control and brake fluid pressure control amount in the brake control. Namely, the throttle opening control amount in the subthrottle valve 45 is provided as follows. First, a basic control amount T of the throttle opening is provided by using MAP12 shown in FIG. 9 whose parameters are the difference EN between the slip value S and the target slip value SET and the differential rate DEN of the differential EN. The difference EN is obtained by the following equation (5).

$$EN = S - SET \quad (5)$$

In MAP12, Z0 means that the throttle opening is maintained, N means that the throttle opening is decreased or the sub throttle valve is closed, and P means that the throttle opening is increased or the sub throttle valve is opened. Further, suffix letters S, M, B to N or P mean respectively control amount in the throttle opening, and the suffix letters S, M, B mean respectively small amount, medium amount and big amount.

Second, a correction coefficient TG of the throttle opening is obtained by using MAP13 shown in FIG. 10 whose parameters are throttle opening (0%–100%) and engine rotation speed NER. Finally, a basic control amount Tn (=T·TG) of the throttle opening is provided.

In MAP13 in FIG. 10, the smaller the throttle opening is or the smaller the engine rotation speed is, the smaller value the correction coefficient TG has, since the engine makes quick response under such conditions. The correction coefficient TG of the throttle opening may employ only the throttle opening in Table 3.

In the same manner, the control amount of the brake fluid pressure can be obtained. Namely, the control amount of the brake fluid pressure is obtained as a basic brake control amount $BL_0$ by using MAP14 shown in FIG. 11 whose parameters are the difference ENL between the slip value S and the target slip value SBT and the differential rate DENL of the difference ENL.

In MAP14 in FIG. 11, Z0 means that the brake fluid pressure is maintained, N means that the brake fluid pressure is increased, and P means that the brake fluid pressure is decreased. Further, suffix letters S, M, B to N or P mean respectively control amount in the brake fluid pressure, and the suffix letters S, M, B mean respectively small amount, medium amount and big amount.

Brake Fluid Pressure Estimation Means 77

The brake fluid pressure estimation means 77 estimates the brake fluid pressures in the respective driven wheels 2RR, 2RL based on the signals from the brake fluid pressure sensors 64, 65 detecting the brake fluid pressures in the driven wheels.

In stead of employing the brake fluid pressure sensors 64, 65, the brake fluid pressure may be estimated by detecting time periods of the increasing pressure and decreasing pressure operations in the respective valves 36A, 36B, 37A and 37B and then obtaining the difference between such time periods.

Means for Providing Correction Amount of Brake Fluid Pressure 78

The means for providing correction amount of brake fluid pressure 78 provides a correction amount TB of the brake fluid pressure by converting the lower one of the brake fluid pressures in the driven wheels detected by the brake fluid pressure estimating means 77 into the engine output by using a following equation (6).

$$TB = K \cdot \min(PL, PR) \tag{6}$$

where K is a converting coefficient, and min (PL, PR) means the lower one of the brake fluid pressures in the driven wheels.

Basic Control Amount First Correction Means 79

The basic control amount first correction means 79 provides a control amount Tn of the throttle opening by subtracting the correction amount TB of the brake fluid pressure provided by the means for providing correction amount of brake fluid pressure 78 from the basic control amount T of the throttle opening provided by the basic control amount providing means 76. That is, the control amount Tn of the throttle opening is provided by using a following equation (7).

$$Tn = (T - TB) \cdot TG \tag{7}$$

Yaw Rate Difference Calculation Means 80

The yaw rate difference calculation means 80 calculates a yaw rate $\phi'$ by using accelerations of the front and rear portions of the vehicle body respectively detected by the lateral acceleration sensors 134a and 134b (see FIG. 2) and then calculates a yaw rate difference delta TR ($=|\phi' - \phi T|$) between an actual yaw rate $\phi'$ and a target yaw rate $\phi T$.

Rear Wheel Steering Angle Detection Means 81

The rear wheel steering angle detection means 81 uses the rear wheel steering angle sensor 135 (see FIG. 2) which detects a rear wheel steering angle $\theta_R$.

Rough Road Determination Means 82

The rough road determination means 82 determines whether a road is a rough road or a normal road. The wheel oscillates by irregular surface of the rough road, and then the wheel rotation speed oscillates by the oscillation of the wheel. As a result, a wheel acceleration also oscillates. Therefore, the rough is determined as a rough road when the number of the case, in which an amplitude of oscillation of the wheel acceleration is beyond a predetermined threshold $\alpha$, is greater than a predetermined threshold $\beta$ during a predetermined time period.

The rough road may be determined based on either of the front wheel or the rear wheel. One example of the determination of the rough road is explained below.

Figure 12:
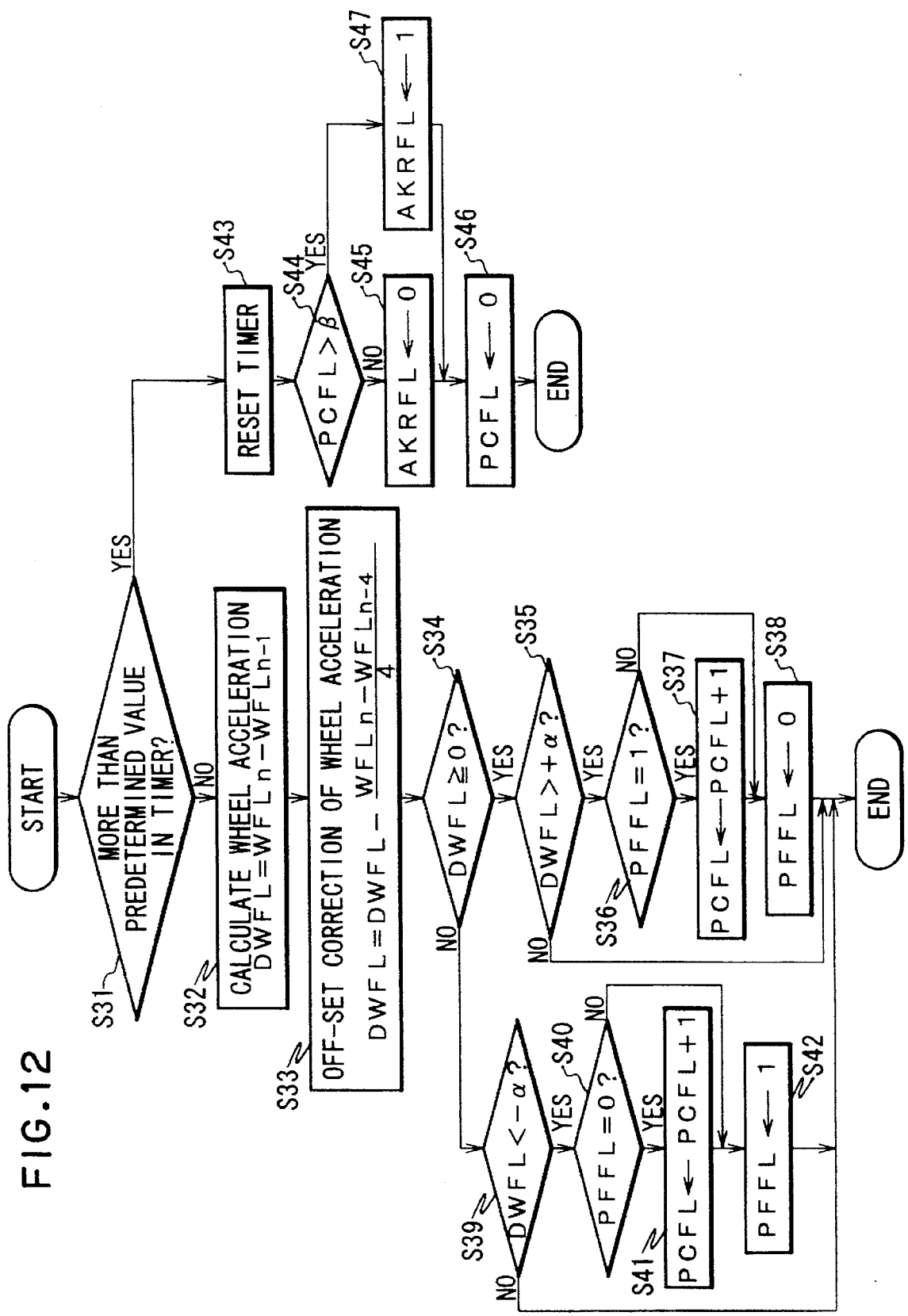
FIG. 12 is a flow chart showing a way how to determine a rough road.

FIG. 12 is a flow chart showing a way how to determine a rough road based on the left front wheel 2FL. Referring to FIG. 12, it is determined in step S31 whether or not the value in the timer is greater than a predetermined value or a predetermined time period such as 0.7 second has passed. If the predetermined time period has not passed, the procedure proceeds to step S32 in which the acceleration DWFL in the left front wheel is calculated. DWFL is obtained by subtracting the last left wheel speed $WFL_{n-1}$ from the current left wheel speed $MFL_n$ as shown in equation (8).

$$DWFL = WFL_n - WFL_{n-1} \tag{8}$$

Next, an offset correction is done in the left front wheel acceleration by using a following equation (9).

$$DWFL = DWFL - (WFL_n - WFL_{n-1})/4 \tag{9}$$

Since the actual wheel acceleration obtained step S32 includes an acceleration of the vehicle body, a true wheel acceleration is obtained by subtracting the acceleration of the vehicle body from the actual wheel acceleration in the offset correction. The acceleration of the vehicle body is shown as $(WFL_n - WFL_{n-1})/4$. That is, firstly the wheel starts to rotate and secondly the vehicle body starts to move. The vehicle body starts to move with a delay which corresponds to about four cycles of this rough road determination routine. Namely, the one cycle of the rough road determination routine is 14 millisecond and the delay of the vehicle body to the wheel is about 56 millisecond. Therefore, the vehicle body acceleration is obtained as an average value of the actual wheel acceleration of four-cycle before.

Figure 13:
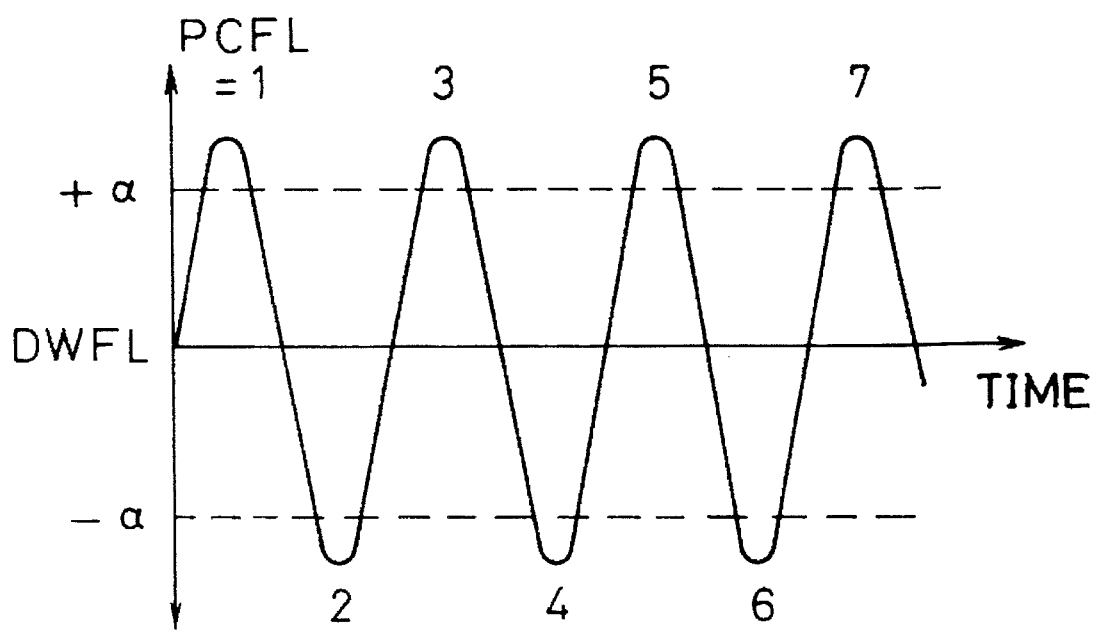
FIG. 13 is a time chart showing an oscillation of wheel acceleration.

Thereafter, the number PCFL of the case, in which the true wheel acceleration DWFL is beyond the predetermined threshold $\alpha$, is counted. Namely, referring FIG. 13, the number PCFL is counted when the peak value of the DWFL is beyond $\alpha$ or $-\alpha$. The number PCFL is counted only when the peak value of the DWFL continuously exceed $\alpha$ and $-\alpha$. For example, when the peak value of the DWFL exceeds one $\alpha$ and thereafter exceeds next $\alpha$ without exceeding $-\alpha$, the peak value of the DWFL exceeding the next $\alpha$ is not counted as the number PCFL. Since the wheel acceleration DWFL oscillates alternatively in the positive side and negative side thereof when the vehicle travels on the rough road, the rough road can be determined with high accuracy.

The number PCFL is specifically counted in steps S34–S42. That is, it is determined in step S34 whether or not DWFL is equal to or greater than zero. When DWFL is equal to or greater than zero, it is determined in step S35 whether or not DWFL is greater than $\alpha$. If the answer is YES in step S35, it is determined in step S36 whether or not left front wheel flag PFFL is set as one. The flag PFFL being set as one means that PCFL was counted by one since the last DWFL exceeded $-\alpha$, and the flag PFFL being as zero or reset means that PCFL was counted by one since the last DWFL exceeded $\alpha$. Therefore, if the flag PFFL is set as one, since PCFL was counted by one because of the last DWLF being beyond $-\alpha$, the procedure proceeds to step S37 in which PCFL is counted by one so as to increment PCFL by one because of the current DWLF being beyond $\alpha$. Then, in step S38, the flag PFFL is set as zero. On the other hand, if the flag PFFL is not set as one in step S36, since both of the current and last DWFL exceeded continuously $\alpha$, the procedure passes step S37 and proceeds directly to step S38 so that counting one peak value two times can be avoided and counting next peak value after the last DWFL being beyond $-\alpha$ can be avoid.

When DWFL is less than zero in step S34, it is determined in step S39 whether or not DWFL is less than $-\alpha$. If the answer is YES in step S39, the procedure proceeds to steps S40–S42 in the similar manner in steps S36–S38. That is, it is determined in step S40 whether or not PFFL is set as zero. If the answer is YES in step S40, PCFL is counted by one in step S41, and then PFFL is set as one in step S42. If the answer is NO in step S40, the procedure passes step S41 and proceeds to step S42.

After repeating steps S31–S42, when it is determined that the timer has more than a predetermined value in step S31, the timer is reset in step S43. Then, it is determined in step S44 whether or not PCFL is greater than a predetermined value $\beta$ such as ten. If the answer is NO in step S44, left front wheel rough road flag AKRFL is set as zero in step S45. If the answer is YES in step S44, the left front wheel rough road flag AKRFL is set as one in step S47. Finally, the procedure proceeds to step S46 in which PCFL is set as zero.

Thereafter, a right front wheel rough road determination is also carried out in the same manner as the left front wheel rough road determination explained above. Finally, it is determined that the road is a rough road when the rough road flags in both of the left and right front wheel rough road determination are set to one or either of the left and right front wheel rough road determination is set to one.

It may be determined that the road is a rough road based on the rear wheels.

Split Road Surface Determination Means 83

The split road surface determination means 83 determines that the road has a split road surface on which friction coefficient in the right driven wheel is different from that in the left driven wheel. A flow chart in FIG. 14 shows a way how to determine a split road surface.

Figure 14:
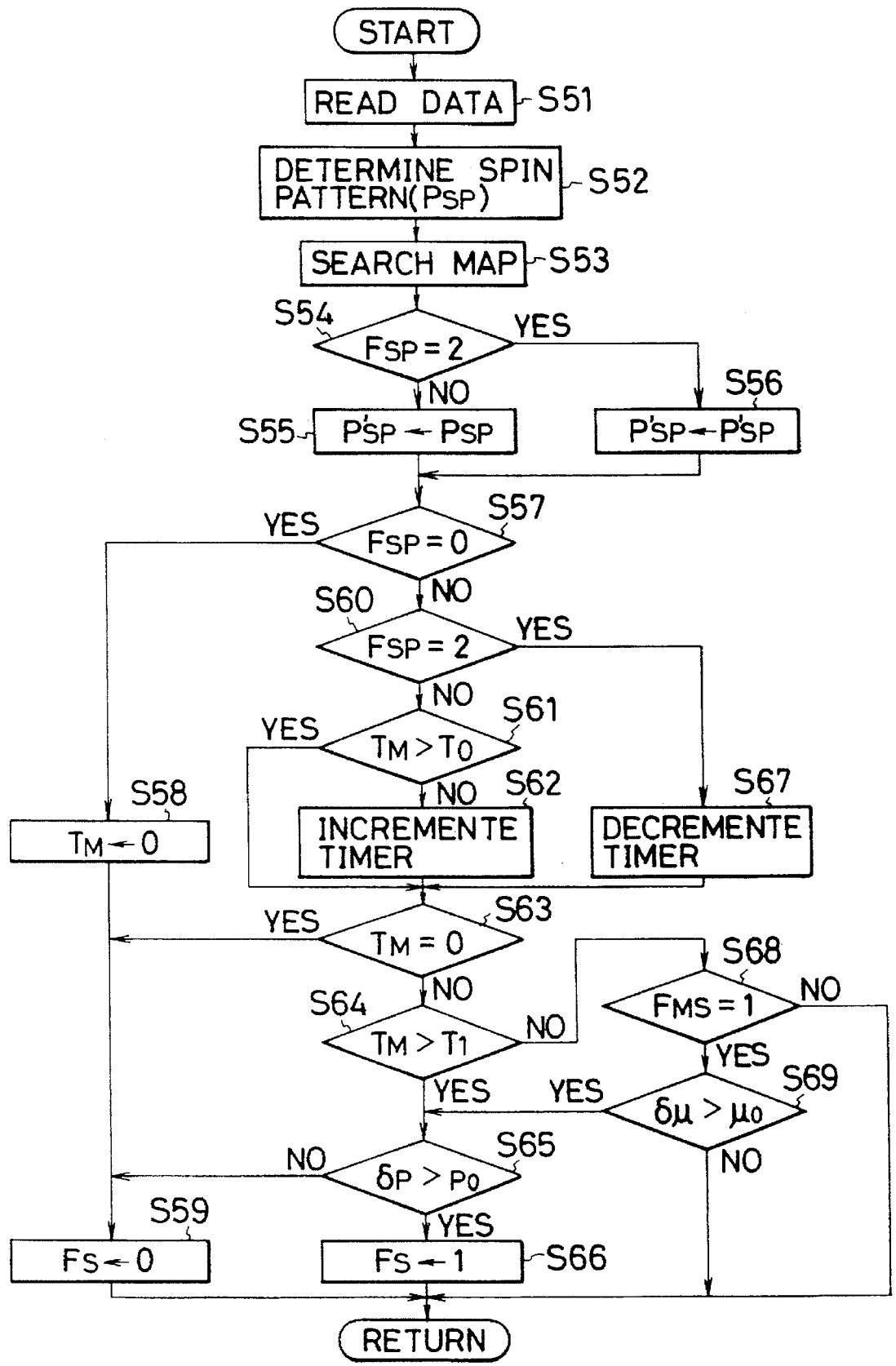
FIG. 14 is a flow chart Showing a way how to determine a split road surface.

Referring to FIG. 14, various data are read in step S51, and then a spin patter $P_{SP}$ regarding the right and left rear driven wheels 2RR and 2RL is determined in step S52. That is, when a first slip value $S_1$ obtained from a speed $V_{RL}$ of the left rear wheel 2RL and an average speed $V_F$ of the front wheels becomes greater than the target slip value SET for the engine control, a first spin flag $F_1$ is set as one. When a second slip value $S_2$ obtained from a speed $V_{RL}$ of the right rear wheel 2RR and an average speed $V_F$ of the front wheels becomes greater than the target slip value SET for the engine control, a second spin flag $F_2$ is set as one. Then, a current spin pattern $P_{SP}$ is determined based on the first spin flag $F_1$ and the second spin flag $F_2$ by using a spin pattern map MAP15 shown in FIG. 15.

As shown in the spin pattern map MAP15 in FIG. 15, the current spin pattern $P_{SP}$ is set as zero when the first and second spin pattern flags $F_1$ and $F_2$ are both zero. The current spin pattern $P_{SP}$ is set as one when the first spin pattern flag $F_1$ is one and the second spin pattern flag $F_2$ is zero. The current spin pattern $P_{SP}$ is set as two when the first spin pattern flag $F_1$ is zero and the second spin pattern flag $F_2$ is one. The current spin pattern $P_{SP}$ is set as three when the first and second spin pattern flags $F_1$ and $F_2$ are both one.

Next, in step S53, a split determination is carried out by using a split determination map MAP16 shown in FIG. 16 which has parameters of the current spin pattern $P_{SP}$ and a last spin pattern $P'_{SP}$ stored in a memory.

As shown in the split determination map MAP16 in FIG. 16, a split determination flag $F_{SP}$ is set as zero when the road is in non split condition, the flag $F_{SP}$ is set as one when the road is in a split condition, and the flag $F_{SP}$ is set as two when the road is continuously in a split condition. The flag $F_{SP}$ is generally set as zero when the current spin pattern $P_{SP}$ is set as zero which shows non split conditions in both of the right and left rear wheels 2RR and 2RL, nevertheless the flag $F_{SP}$ is set as two only when the last spin pattern $P'_{SP}$ is set as one or two which shows non split condition in either one of the right and left rear wheels 2RR and 2RL. Therefore, responsibility can be improved when the spin continuously occurs. The flag $F_{SP}$ is generally set as one when the current spin pattern $P_{SP}$ shows split condition in either one of the right and left rear wheels 2RR and 2RL, nevertheless the flag $F_{SP}$ is set as zero only when the last spin pattern $P'_{SP}$ shows split condition in another one of the right and left rear wheels 2RR and 2RL. Therefore, a split determination carrying out by mistake can be avoided when the vehicle travels on a low μ road such as an ice burn and the spin condition occurs alternatively. The flag $F_{SP}$ is set as zero when the current spin pattern $P_{SP}$ is set as three which shows split conditions in both of the right and left rear wheels 2RR and 2RL.

Next, in step S54, it is determined whether or not the split determination flag $F_{SP}$ is set as two. The current spin pattern $P_{SP}$ is replaced with the last spin pattern $P'_{SP}$ in step S55 when the answer is NO in step S54, and the last spin pattern $P'_{SP}$ is held in step S56 when the answer in YES in step S54.

Then, in step S57, it is determined whether or not the split determination flag $F_{SP}$ is set as zero. If the answer is YES in step S57, the procedure proceeds to step S58 in which a count number $T_M$ in a timer is reset, and further proceeds to step S59 in which a split control flag $F_S$ is set as zero which shows that a split control is not carried out.

On the other hand, if the answer is NO in step S57, the procedure proceeds to step S60 in which it is determined whether or not the split determination flag $F_{SP}$ is set as two. If the answer is NO in step S60, the procedure proceeds to step S61 in which it is determined whether or not the count number $T_M$ in the timer is greater than a predetermined upper limit $T_0$ such as 10 seconds. If the answer is NO in step S61, the procedure proceeds to step S62 in which the count number $T_M$ is added, and further proceeds to step S63 in which it is determined whether or not the count number $T_M$ is zero. If the answer is NO in step S63, the procedure proceed to step S64 in which it is determined whether or not the count number $T_M$ in the timer is less than a predetermined lower limit $T_1$ such as 0.5 second. If the answer is YES in step S64, the procedure proceeds to step S65 in which it determined whether or not a difference pressure $\delta_P$ in the brake fluid pressure, which is shown by the brake pressure sensors 64 and 65, is greater than a predetermined standard value $p_0$. If the answer is YES in step S65, the procedure proceeds to step S66 in which the split control flag $F_S$ is set as one which shows that the split control is carried out.

If the answer is YES in step S60, the procedure proceeds to step S67 in which the count number $T_M$ is subtracted, and proceeds to step S63. Then, if the count number $T_M$ is zero in step S63, the procedure proceeds to step S59 in which the split control is over and is transferred to the normal control.

If the answer is NO in step S64, it is determined in step S68 whether or not a μ estimation flag $F_{MS}$ at a starting time of the vehicle is set as one which shows the road surface friction coefficient μ was estimated at the starting time. If the flag FMS is set as one, it is determined in step S69 whether or not a difference $\delta\mu$ $(=|\mu_R-\mu_L|)$ between the friction coefficients $\mu_R$ and $\mu_L$ in the right and left rear wheels is greater than a predetermined standard value $\mu_0$. If the answer is YES in step S69, the procedure returns to step S65 in which it is determined whether or not a difference pressure $\delta_P$ in the brake fluid pressure, which is shown by the brake pressure sensors 64 and 65, is greater than a predetermined standard value $p_0$. If the answer is YES in step S65, the procedure proceeds to step S66 in which the split control flag $F_S$ is set as one which shows that the split control is carried out.

Basic Control Amount Second Correction Means 84

The basic control amount second correction means 84 corrects the basic control amount Tn and the basic brake control amount $BL_0$, calculated by the basic control amount first correction means 79, by using the yaw rate difference, the rear wheel steering angle, the rough road determination and the split determination in order to obtain finally a basic control amount Tn of the throttle opening and a basic brake control amount $BL_0$. The correction by the basic control amount second correction means 84 is shown in a flow chart in FIG. 17.

Figure 17:
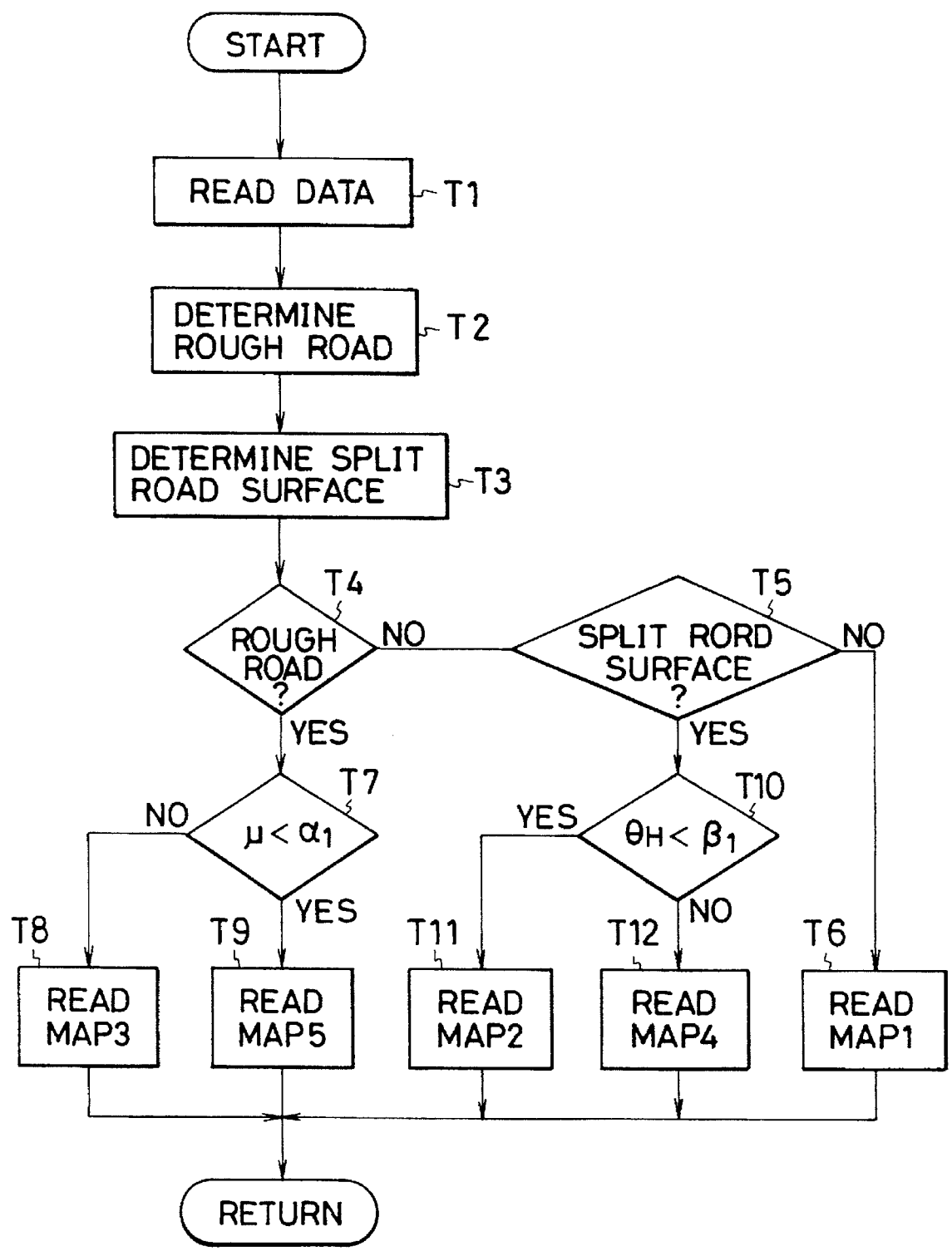
FIG. 17 is a flow chart for selecting one map among MAP1 through MAP5 based on driving conditions.

Referring to FIG. 17, various data is read in step T1. Next, a rough road is determined by the rough road determination means 82 in step T2, and a split road surface is determined by the split road surface determination means 83 in step T4. Then, it is determined whether or not the road is a rough road in step T4, and it is determined whether or not the road has a split road surface in step T5. If both of the answer are NO in steps T4 and T5, which means that the road has a normal condition, the procedure proceeds to step T6 in which MAP1, a control map for normal condition, is read.

If the rough road is determined in step T4, it is determined in step T7 whether or not road surface friction coefficient μ is less than a predetermined value $\alpha_1$. If the answer is NO in step T7, which means that the road has middle or high friction coefficient, the procedure proceeds to step T8 in which MAP3, a control map for a normal rough road, is read. If the answer is YES in step T7, which means that the road has low friction coefficient, the procedure proceeds to step T9 in which MAP5, a control map for a low μ rough road, is read.

If the split road surface is determined in step T5, it is determined in step T10 whether or not the steering angle $\theta_H$ is less than a predetermined value $\beta_1$. If the answer is YES in step T10, the procedure proceeds to step T11 in which MAP2, a control map for a normal split road surface, is read. If the answer is NO in step T10, the procedure proceeds to step T12 in which MAP4, a control map for a split road surface in a large steering angle, is read. This is because the four wheel steering device (4WS) has a performance limit under such condition.

Next, these MAP1 (see FIG. 19), MAP2 (see FIG. 20), MAP3 (see FIG. 21), MAP4 (see FIG. 22), MAP5 (see FIG. 23) and MAP10 (see FIG. 18) will be explained below.

Referring to FIG. 19, in MAP1, a yaw rate difference deltaTR ($=|\phi'-\phi'T|$) is a difference between an actual yaw rate $\phi'$ and a target yaw rate $\phi'T$, and AREAs are areas which are respectively divided by the yaw rate difference (deltaTR) and the rear wheel steering angle ($\theta_R$), as shown in FIG. 18.

Referring to FIG. 18, there are provided AREA0 in which both of the yaw rate difference and the rear wheel steering angle are small, AREA9 in which the yaw rate difference large and the rear wheel steering angle is is middle, AREA10 in which the yaw rate is large and the rear wheel steering angle is small, AREA11 in which both of the yaw rate difference and the rear wheel steering angle are middle, AREA12 in which the yaw rate difference is middle and the rear wheel steering angle is small, AREA14 in which the yaw rate difference is small and the rear wheel steering angle is large, and AREA15 in which the yaw rate difference is small and the rear wheel steering angle is middle. In MAP10, the yaw rate difference is small where $0 \leq$ deltaTR $< 2$, the yaw rate difference is middle where $2 \leq$ deltaTR $< 5$, and the yaw rate difference is large where $5 \leq$ deltaTR. The rear wheel steering angle is small where $0 \leq \theta_R < 0.5$, the rear wheel steering angle is middle where $0.5 \leq \theta_R < 2$, and the rear wheel steering angle is large where $2 \leq \theta_R$.

Referring back to FIG. 19, USPA and USPB are thresholds for starting the engine control, and USPA is provided to be greater than USPB, as mentioned above. KDRIVEE is a correction coefficient of the target slip value SET for the engine control, and KDRIVEB is a correction coefficient of the target slip value SBT for the brake control. BNHOSE is a correction amount for increasing the brake pressure in the brake control, and BNHOSE being 2 means that the brake fluid is to be further increased by 2 levels. BPHOSE is a correction amount for decreasing the brake pressure in the brake control, and BPHOSE being $-1$ means that the brake fluid is to be further decreased by 1 level. EPHOSE is a correction coefficient of a control amount for increasing the throttle opening in the engine control, and ENHOSE is a correction coefficient of a control amount for decreasing the throttle opening in the engine control.

These items in MAP1 are as same as those in MAP2-MAP5.

The driving condition where the yaw rate difference or the rear wheel steering angle is large will be explained before content in MAP1 in FIG. 19 is explained.

When the yaw rate difference between the actual yaw rate and the target yaw rate is large, the vehicle may be considered to travel in following driving conditions. That is, firstly, the vehicle has an over-steering condition since road surface friction coefficient μ is small and therefore a necessary cornering force of the rear wheels cannot be established by a steering operation of rear wheels (Case 1). Secondly, the front engine rear drive vehicle (FR vehicle) has an over-steering condition since the FR vehicle has a high slip ratio in rear wheels and therefore a necessary cornering force of the rear wheels cannot be established (Case 2).

According to the present invention, the above-mentioned conditions in Case 1 and Case 2 are determined based on the yaw rate difference between the actual yaw rate and the target yaw rate, and the target slip values SET and SBT for the slip control and the control amounts are corrected so that the yaw rate difference becomes small. As a result, the slip control assists the four wheel steering device (4WS) and therefore both of stability and turning ability of the vehicle can be improved.

When the rear wheel is steered by the four wheel steering device (4WS) and the rear wheel steering angle is large, the vehicle may be considered to travel in a following driving condition. That is, the vehicle has an over-steering condition since a necessary cornering force of the rear wheels cannot be established when the rear wheel steering angle has the same phase as the front wheel steering angle during the vehicle traveling in a corner (Case 3).

According to the present invention, the above-mentioned condition in Case 3 is determined based on the rear wheel steering angle, and the target slip values SET and SBT for the slip control and the control amounts are corrected. As a result, the slip control assists the four wheel steering device (4WS) and therefore both of stability and turning ability of the vehicle can be improved.

Referring back to FIG. 19, contents of correction in respective AREAs (AREA: 0, 9, 10, 11, 12, 14, 15) provided in MAP1 will be explained.

In AREA0 where both of the yaw rate difference and the rear wheel steering angle are small, since it is considered that the yaw rate is well controlled only by the four wheel steering device (4WS), the slip control is not corrected. As a result, the slip control system can be properly operated so that the vehicle has good accelerating ability.

In AREA9 where the yaw rate difference is large and the rear wheel steering angle is middle, since it is considered that the above-mentioned driving conditions of Cases 1-3 are enhanced so much, the slip control is corrected by following manners. That is, the thresholds USPA and USPB for starting the engine control are lowered, the target slip value SET for the engine control and the target slip value SBT for the brake control are much lowered or the correction coefficients KDRIVEE and KDRIVEB in SET and SBT are much made small, and the correction amount BNHOSE for increasing the brake pressure in the brake control is increased. Thus, the torques applied to the driven rear wheels 2RR and 2RL are much reduced so that accelerating ability is much reduced. As a result, the vehicle can obtain stability.

In AREA10 where the yaw rate difference is large and the rear wheel steering angle is small, since it is considered that the above-mentioned driving conditions of Cases 1-3 are enhanced but not less enhanced than those in AREA9, the slip control is corrected by following manners. That is, the thresholds USPA and USPB for starting the engine control are lowered, the target slip value SET for the engine control and the target slip value SBT for the brake control are lowered or the correction coefficients KDRIVEE and KDRIVEB in SET and SBT are made small, and the correction amount BNHOSE for increasing the brake pressure in the brake control is increased. Further, the correction amount BPHOSE for decreasing the brake pressure in the brake control is increased in order to prevent an excessively increased brake pressure. Thus, the torques applied to the driven rear wheels 2RR and 2RL are reduced so that accelerating ability is reduced. As a result, the vehicle can obtain stability.

In AREA10 where both of the yaw rate difference and the rear wheel steering angle are middle, since it is considered that the above-mentioned driving conditions of Cases 1–3 are enhanced in the same level as those in AREA10, the slip control is corrected in the same manner as that in AREA10.

In AREA12 where the yaw rate difference is middle and the rear wheel steering angle is small, since it is considered that the above-mentioned driving conditions of Cases 1–3 are not so much enhanced and not less enhanced than those in AREA10, the slip control is corrected by following manners. That is, the target slip value SET for the engine control and the target slip value SBT for the brake control are a little lowered or the correction coefficients KDRIVEE and KDRIVEB in SET and SBT are a little made small. Thus, the torques applied to the driven rear wheels 2RR and 2RL are kept in a necessary level, and the vehicle can obtain stability.

In AREA14 where the yaw rate difference is small and the rear wheel steering angle is large, since it is considered that the above-mentioned driving conditions of Cases 1–3 are enhanced in the same level as those in AREA11, the slip control is corrected in the same manner as that in AREA11.

In AREA15 where the yaw rate difference small and the rear wheel steering angle are middle, since it is considered that the above-mentioned driving conditions of Cases 1–3 are not so much enhanced in the same level as those in AREA12, the slip control is corrected in the same manner as that in AREA12.

According to the embodiment of the present invention, since the slip control is corrected by using MAP1 in FIG. 19. That is, when the vehicle is in an unstable condition because of the large yaw rate difference and the large rear wheel steering angle, the slip control decreases the torques applied to the driven rear wheels. As a result, the vehicle can obtain stability. Further, when both of the yaw rate difference and the rear wheel steering angle are small and therefore the vehicle is in a stable condition, the vehicle can obtain a good acceleration ability by carrying out the slip control without the correction.

Next, contents of correction in MAP2 in FIG. 20 will be explained in comparison with MAP1 in FIG. 19. MAP2 is a control map for a split road surface in a normal condition where a rear wheel steering angle is not large. In MAP2, the correction coefficients KDRIVEE of the target slip value SET for the engine control in the respective AREAs (AREA: 0, 9, 10, 11, 14, 15) are increased so that the driven rear wheels are corrected to be accelerated. Further, the correction coefficients EPHOSEs of the control amount for increasing the throttle opening are increased and the correction coefficients ENHOSEs of the control amount for decreasing the throttle opening are decreased so that the driven rear wheels are corrected to be much accelerated. In AREA10 where the yaw rate difference is large, KDRIVEB is made small so as to obtain traveling stability by using braking force. Contents of correction in other AREAs are as same as those in MPA1.

Thus, the acceleration ability of the vehicle can be increased when the vehicle is traveling on the split road surface by the slip control being corrected by MAP2.

Next, contents of correction in MAP3 in FIG. 21 will be explained in comparison with MAP1 in FIG. 19. MAP3 is a control map for a rough road in a normal condition where the road is not a low µ road. In MAP2, the thresholds USPA and USPB for starting the engine control are made large. Further, both of the correction coefficients KDRIVEE of the target slip value SET for the engine control and the correction coefficients KDRIVEB of the target slip value SBT for the brake control in the respective AREAs (AREA: 0, 9, 10, 11, 14, 15) are increased so that the driven rear wheels are corrected to be more accelerated than those in MAP1 and MAP2.

However, the correction coefficients EPHOSEs of the control amount for increasing the throttle opening are more increased than those in MAP1 but less increased than those in MAP2. Other contents of correction in MAP3 are as same as those in MPA1.

Thus, the acceleration ability of the vehicle can be increased when the vehicle is traveling on the rough road by the slip control being corrected by MAP3.

Next, contents of correction in MAP4 in FIG. 22 will be explained. MAP4 is a control map for a split road surface where a steering wheel angle is large. Contents of correction in MAP4 are almost same as those in MAP2 except AREA 14. In AREA14 in MAP4, the correction coefficient KDRIVEB of the target slip value SBT for the brake control is made small in comparison with that in MAP2. Since the AREA14 is an area where the four wheel steering device (4WS) has a performance limit because of the large rear steering angle, the slip control is corrected so that the torques applied to the driven rear wheels are easily decreased by applying the brake force.

Next, contents of correction in MAP5 in FIG. 23 will be explained in comparison with MAP1 in FIG. 19. MAP2 is a control map for a rough road where the road is a low µ road. In MAP5, the thresholds USPA and USPB for starting the engine control are made small. Both of the correction coefficients KDRIVEE of the target slip value SET for the engine control and the correction coefficients KDRIVEB of the target slip value SBT for the brake control in the respective AREAs (AREA: 0, 9, 10, 11, 14, 15) are decreased so that the driven rear wheels are corrected to be decelerated. Further, both of the correction coefficients EPHOSEs of the control amount for increasing the throttle opening and the correction coefficients ENHOSEs of the control amount for decreasing the throttle opening are increased.

Thus, the slip control is corrected by MAP5. As a result, the vehicle speed is reduced when the vehicle is traveling on a low µ road, and responsibility in applying the brake force can be improved by increasing both of the correction coefficients BNHOSEs and BPHOSEs for the correction amount.

Valve Speed Providing Means 85

The valve speed providing means 85 provides a valve operational speed (unit; %/second) of the sub throttle valve 45 based on the control amount Tn of the throttle opening provided by the basic control amount second correction means 84 by using MAP17 in FIG. 24. The condition of the sub throttle 45 being opened fully corresponds to 100%.

In MAP17, the valve operational speed is provided in the large control amount region such as NB, PB so that the valve speed in NB is larger than that in PB, and provided in the small control amount region such as NM, NS, PS and PM so that the opening speed in PS, PM and the closing speed in NS, NM are equal respectively under the both control amounts being equal each other.

First and Second Drive Means 86 and 87

The first valve drive means 86 sends a driving signal to the actuator 44 which drives the sub throttle valve 45 at the speed provided by the valve speed providing means 85 so that the control amount Tn of the throttle opening provided by the basic control amount second correction means 74 is obtained.

The second drive means 87 sends driving signals to the valves 32, 36A, 36B, 37A and 37B so that control amount of the brake fluid pressure provided by the basic control amount second correction means 84 is obtained.

Next, the content of the control operation of the sub throttle valve 45 will be explained below with reference to FIG. 25.

Figure 25:
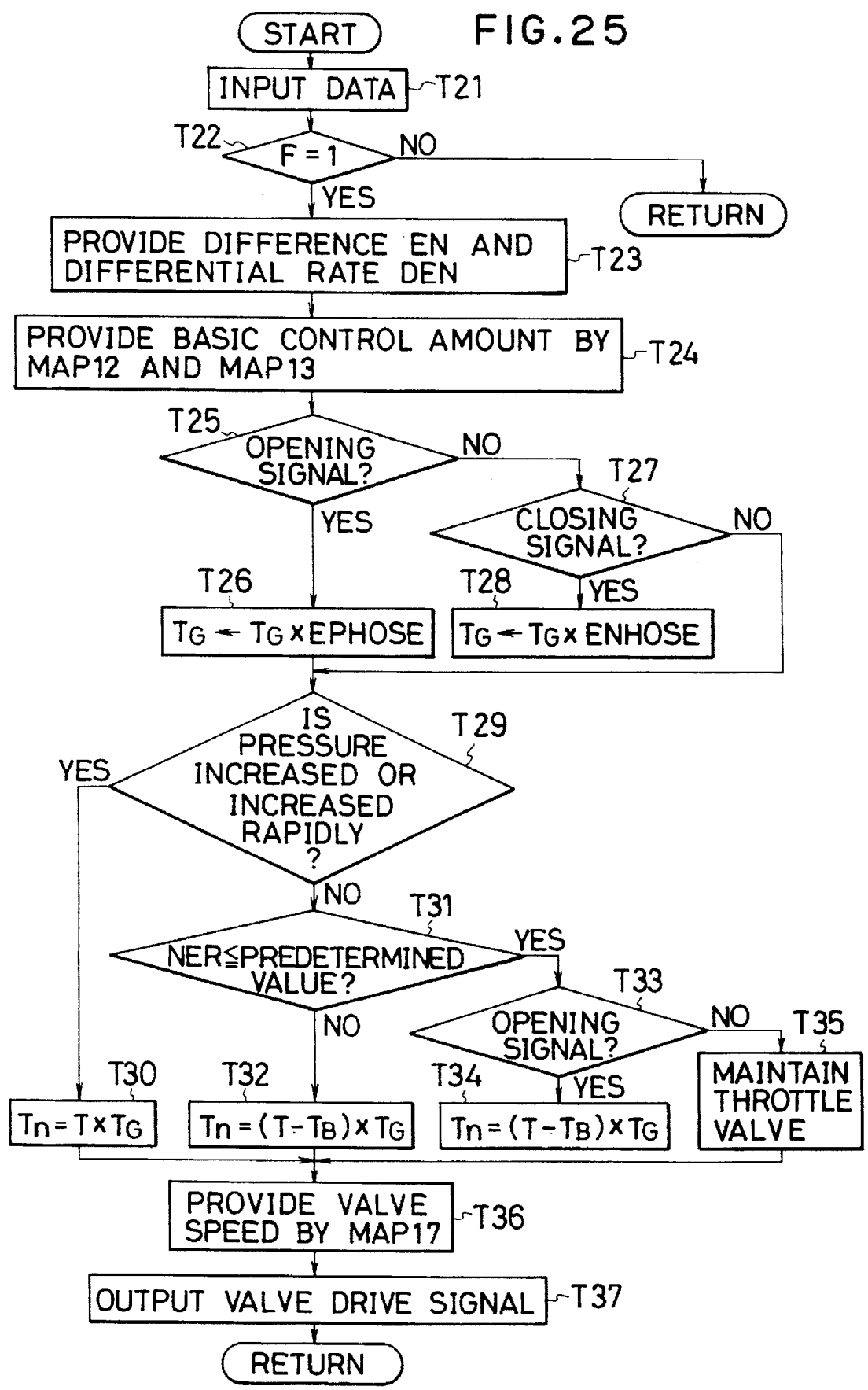
FIG. 25 is a flow chart showing a way how to carry out an engine control.

Referring to FIG. 25, various data are input in step T21, and then it is determined whether or not the slip control is being carried out (F=1) in step T22. When the slip control is being carried out, the difference EN and the differential rate DEN of the difference EN in the slip value are provided in step T23. In step T24, the basic control amount Tn (=T·TG) of the throttle opening in the sub throttle valve 45 is provided based on the above-mentioned EN and DEN by using MAP12 and MAP13.

Next, it is determined in step T25 whether or not the signal for throttle opening is an opening signal (PB, PM, PS) by which the sub throttle valve 45 is opened. When it is determined that the signal is an opening signal, the procedure proceeds to step T26 in which the correction coefficient $T_G$ for the control amount in the throttle control is replaced with $T_G$·EPHOSE. EPHOSE is obtained by using MAP1–MPA5. When it is determined that the signal is an opening signal, the procedure proceeds to step T27 in which it is determined whether or not the signal for throttle opening is a closing signal (NB, NM, NS) by which the sub throttle valve 45 is closed. When it is determined that the signal is a closing signal, the procedure proceeds to step T28 in which the correction coefficient $T_G$ for the control amount in the throttle control is replaced with $T_G$·ENHOSE. ENHOSE is obtained by using MAP1–MAP5. When the signal for throttle opening is an maintaining signal by which the opening of the sub throttle valve 45 is maintained, the procedure passes steps T26 and T27 and proceeds to step T29.

In step T29, it is determined whether or not the brake fluid pressure is in phase zero where the brake fluid pressure is increased or increased rapidly.

Figure 26:
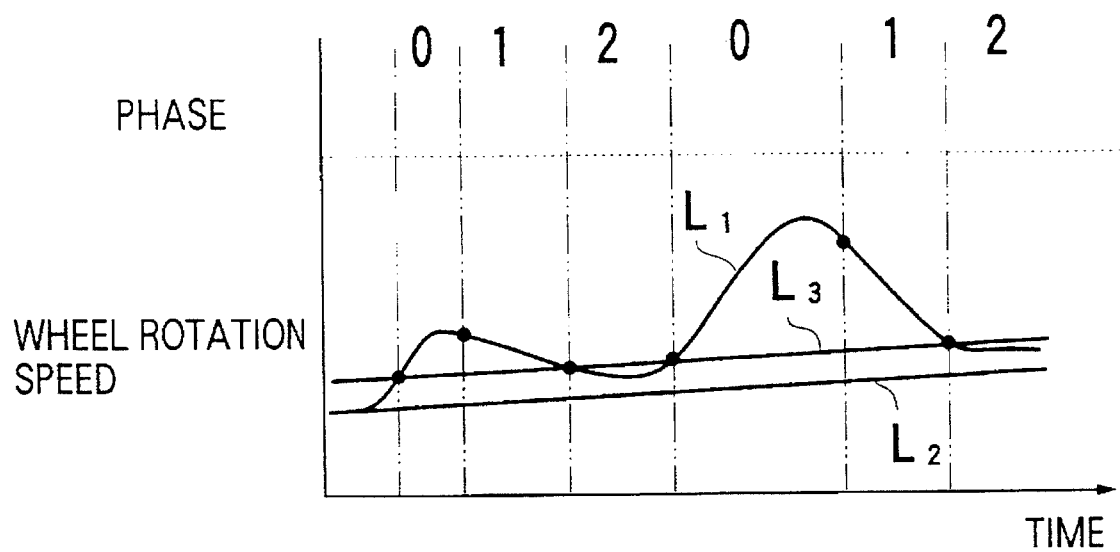
FIG. 26 is a time chart showing a wheel rotation speed for determination of phases.
Figure 27:
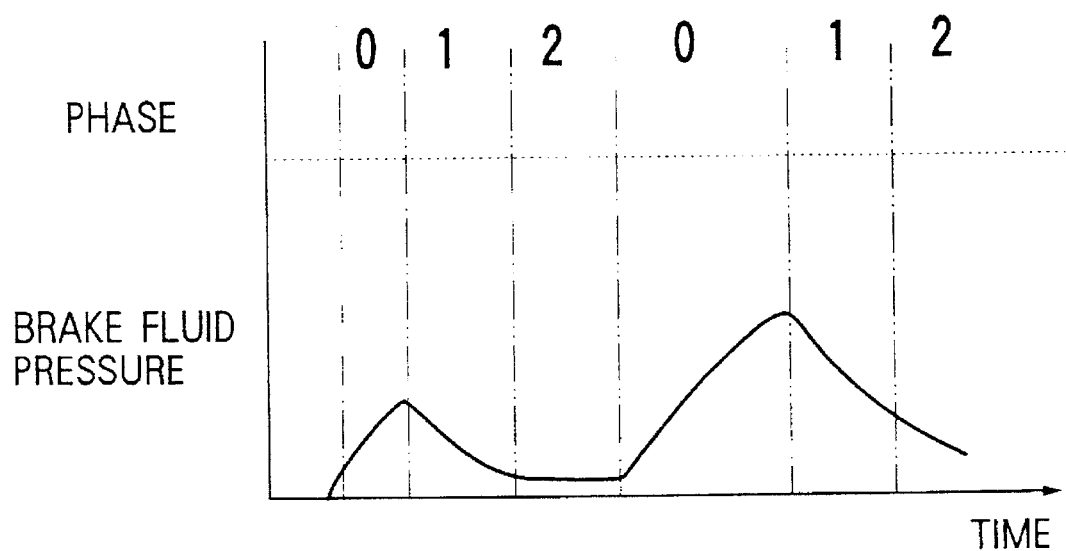
FIG. 27 is a time chart showing brake fluid pressure for determination of phases.

How to determine respective phases of the brake fluid pressures is shown in FIGS. 26 and 27. In FIG. 26, $L_1$ shows a wheel rotation speed of the driven wheel, $L_2$ shows an average wheel rotation speed both of the nondriven wheels, and $L_3$ shows a target slip value SBT. FIG. 27 shows brake fluid pressure corresponding to the wheel rotation speed in FIG. 26. The brake fluid pressure is increased or increased rapidly in phase 0 in accordance with the slip value which is increasing, is decreased in phase 1 in accordance with the slip value which is decreasing, and is maintained in phase 2 in accordance with the slip value which is less than the target slip value SBT.

When it is determined that the brake fluid pressure in the driven wheel is in the phase 0 in step T29, the control amount Tn (=T·TG) of the throttle opening is provided in step T30 in which the correction amount $T_B$ of the brake fluid pressure is not subtracted from the basic control amount T of the throttle opening. If the control amount of the throttle opening is corrected with the correction amount $T_B$ of the brake fluid pressure when the brake fluid pressure is in the phase 0 in which the brake fluid pressure is increased or increased rapidly, the acceleration ability of the vehicle is decreased since the sub throttle valve 45 is closed too much. Therefore, in order to prohibit above problem on the acceleration ability, the control amount Tn is provided as the above-mentioned in step T30.

When it is determined that the brake fluid pressure in the driven wheel is in the phase 0 in step T29, the procedure proceeds to step T31 in which it is determined whether or not the engine rotation number NER is less than or equal to a predetermined value. The predetermined value is provided as a lower limit value of the engine rotation number so that the engine stall and a decrease in acceleration ability are prevented and the slip control can be carried out. The predetermined value is obtained by MAP28 shown in FIG. 28 whose parameters is the sum of the average of the nondriven wheel rotation speeds and the basic value STAO for the engine control, and the other of its parameters is gear positions.

When it is determined that the engine rotation number NER is not less than or equal to the predetermined value in step T31, the procedure proceeds to step T32 in which the control amount Tn (=(T–$T_B$)·$T_G$) of the throttle opening obtained by the basic control amount first correction means 79 is provided. Namely, in step T32, the lower one of the brake fluid pressures in the right and left driven wheels is converted into corresponding engine output, and the throttle opening amount $T_B$ corresponding to the converted engine output is subtracted from the basic control amount T of the throttle opening. As a result, one portion of the load of the brake is transmitted to the engine, and therefore the load of the brake can be decreased. Further, since the lower one of the brake fluid pressures in the right and left driven wheels is converted into the engine output, enough driving torque in the driven wheels can be obtained so that the vehicle can travel with no serious problem even if the vehicle is running on a so-called split road while the slip control is being carried out. As a result, good starting ability and acceleration ability can be obtained under such conditions. On the other hand, since the difference between the brake fluid pressures in the right and left driven wheels is relatively small when the vehicle is running on the low μ road whose right and left sides have the same low μ, there is no specific problem even if lower one of the brake fluid pressures in the right and left driven wheels is employed.

When it is determined that the engine rotation number NER is less than or equal to the predetermined value in step T31, the procedure proceeds to T33 in which it is determined whether or not the signal for throttle opening is an opening signal by which the sub throttle valve 45 is opened. When it is determined that the signal is an opening signal, the procedure proceeds to step T34 in which the control amount Tn (=(T–$T_B$)·$T_G$) of the throttle opening is provided in the same way as in step T32 even if the engine rotation number NER is less than or equal to the predetermined value. When the engine rotation number NER is less than or equal to the predetermined value and the signal is not an opening signal, the procedure proceeds to step T35 in which the throttle opening is maintained at the present condition.

Next, the procedure proceeds to step T36 in which the valve operational speed is determined by using MAP17 in FIG. 24 based on the control amounts provided in steps T30, T32, T34 and T35. Then, in step T37, the valve drive signal is output by which the sub throttle valve 45 is driven.

Next, the way how to control brake pressure in the brake control will be explained with reference to FIG. 29.

Figure 29:
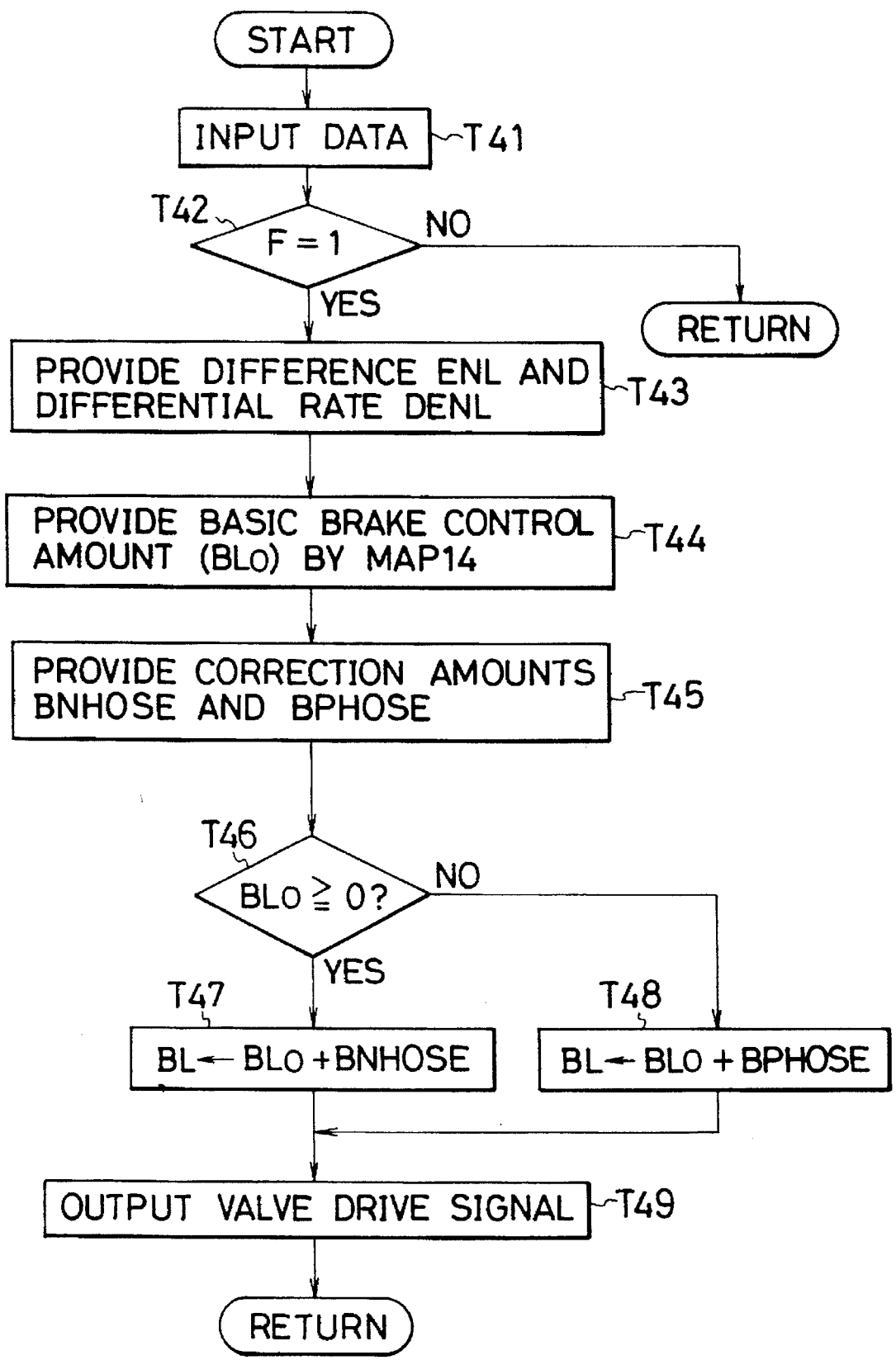
FIG. 29 is a flow chart showing a way how to carry out a brake control.

Referring to FIG. 29, data are input in step T41, and then it is determined in step T42 whether or not the slip control is been carried out (F=1). When the slip control is being carried out, the difference ENL between the slip value and the target slip value SBT for the brake control and the differential rate DENL of the difference ENL are provided in step T43. In step T24, the basic brake control amount $BL_0$ is provided based on the above-mentioned ENL and DENL by using MAP14. Next, in step T45, correction amounts BNHOSE and BPHOSE are provided by using MAP1–MAP5.

Thereafter, in step T46, it is determined whether or not the basic brake control amount $BL_0$ is equal to or more than zero which means that the brake pressure is maintained or decreased. When the answer is YES in step T46, the procedure proceeds to step T47 in which the basic brake control amount BL is provided to be $BL_0$+BNHOSE. When the answer in NO in step T46, the procedure proceeds to step T48 in which the basic brake control amount BL is provided to be $BL_0$+BPHOSE.

Then, the valves 32, 36A, 36B, 37A and 37B are driven so that the brake pressure becomes equal to the provided basic brake control amount BL.

Content of the Slip Control

The content of the slip control will be explained with reference to FIG. 30. The slip control is carried out by the slip control unit 70, and the slip control includes the engine control and the brake control.

Figure 30:
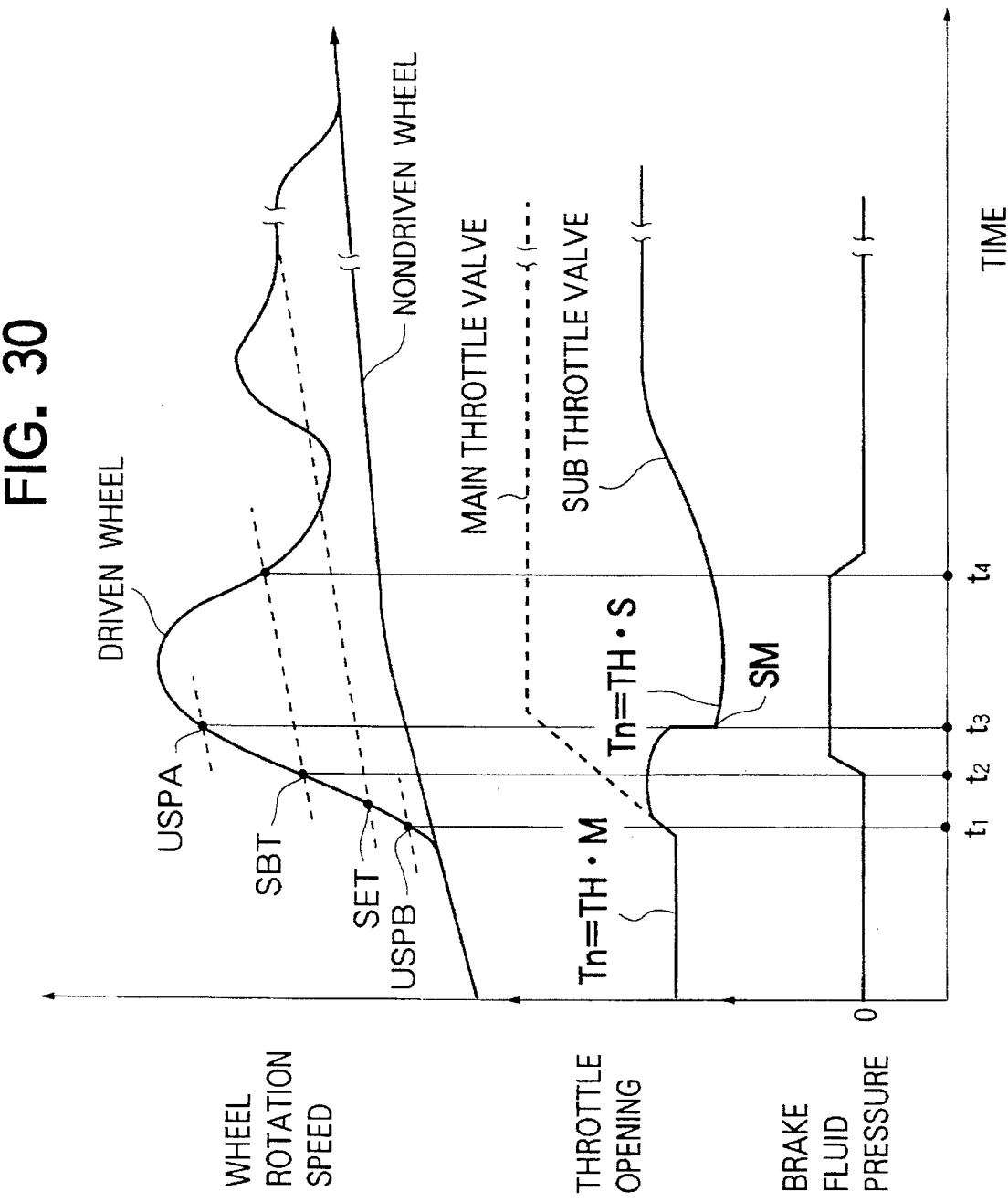
FIG. 30 is a time chart showing a traction control.

Referring to FIG. 30, before the time $T_1$, the slip of the driving wheel is so small so that the engine control is not carried out. At this time, the sub throttle valve 45 is fully opened and the throttle opening Tn, which is a composite opening of the main throttle valve 43 and the sub throttle valve 45 and is determined by whichever throttle valve is open least, is operated by the main throttle valve opening TH·M which is determined by an operational amount of the acceleration pedal 42.

At the time $t_1$, since the slip value of the driven wheel has exceeded the threshold USPB for the starting engine control, the engine control is started. Hereafter, the throttle opening of the sub throttle valve 45 is controlled by a feedback control so that the slip value of the driven wheel becomes less than the target slip value SET for the engine control. After the engine control for the slip control is started, the throttle opening Tn becomes equal to the sub throttle opening TH·S of the sub throttle valve 45.

At the time $t_2$, since the slip value of the driven wheel has become greater than the target slip value SBT for the brake control, the brake fluid pressure is supplied to the brakes 21RR, 21RL of the driven wheels, and as a result the slip control employing both the engine control and the brake control has been started.

At the time $t_3$, since the slip value in the driven wheel has exceeded the threshold USPA for starting the engine control, the sub throttle valve 45 is controlled by a feedforward control so that the throttle opening Tn is dropped down to the lower limit control value SM. After the throttle opening Tn is dropped down to the lower limit control value SM, the throttle opening of the sub throttle valve 45 is controlled by a feedback control so that the slip value of the driven wheel becomes less than the target slip value SET for the engine control.

At the time $t_4$ or when the slip value of the driven wheel has become less than the target slip value SBT for the brake control, the brake fluid pressure is reduced to zero and the brake control is finished. Meanwhile, the engine control is still being carried out.

Hereinafter, the engine control for the slip control will be described in detail. When the throttle opening is dropped down to the lower limit control value SM at the time $t_1$, the slip value of the driven wheel is still increasing rapidly. Since the difference EN and the differential rate DEN of EN respectively have large positive values at this moment, the control amount NB for example is provided. As a result, the sub throttle valve 45 is closed at a high speed. Then, the slip value of the driven wheel becomes greater than peak of the slip value thereof and approaches the target slip value SET for the engine control.

After this, the control amounts NM, NS and Z0 are respectively provided in order, and the throttle opening is maintained with the sub throttle valve being closed. When the slip value of the driving wheel becomes approximately equal to the target value SET, the control amount PS of the throttle opening is provided based on which the sub throttle valve 45 is controlled to be opened. Under the low control amount region such as NM, NS, Z0 and PS, the valve operational speed is relatively low. As a result, there is a small possibility that the slip value of the driven wheel will increases or decreases rapidly, and therefore the hunting phenomenon in the slip control can be prevented.

On the other hand, when the road surface friction coefficient μ increases for a time, the slip value of the driven wheel may become less than the target slip value SET or in some cases the control amount PB is provided. In this case, the operational valve speed in PB is less than that in NB. As a result, since the throttle opening is not rapidly opened too much, excessive slip of the driven wheel can be prevented after the friction coefficient μ has been changed to the lower one.

In the embodiment, the slip control is finished when the slip value of the driven wheel becomes less than the target slip value SET and the operational amount of the acceleration pedal becomes zero, the throttle opening of the main throttle valve becomes less than that of the sub throttle valve, or the brake pedal is operated.

The brake control is finished when the decrease of the brake fluid pressure has continued for a predetermined time. For example, one is counted when the brake fluid pressures in both driven wheels are decreased, the counted number is reset as zero when the brake fluid pressure is increased, and zero is counted when the brake fluid pressure is maintained or when the brake fluid pressure in one driven wheel is decreased. In this case, the predetermined numbers are counted, the brake control is finished.

The present invention has been described with reference to the preferred embodiments thereof which are intended to be illustrative rather than limiting. Various changes in modifications may be made without departing from the spirit and scope of the present invention in the following claims.

What is claimed is:

1. A traction control system for a motor vehicle comprising:

steering characteristic control means for controlling a steering characteristic of the vehicle based on a yaw rate difference between an actual yaw rate and a target yaw rate of the vehicle;

driven torque control means for controlling driven torque applied to a driven wheel while a slip is generated in the driven wheel; and driven torque correction means for correcting the driven torque so as to decrease as a wheel steering angle increases while said yaw rate difference stays within a particular range and said steering characteristic control means is operated.

2. A traction control system for a motor vehicle comprising:

steering characteristic control means for controlling a steering characteristic of the vehicle based on a yaw rate difference between an actual yaw rate and a target yaw rate of the vehicle;

driven torque control means for controlling driven torque applied to a driven wheel while a slip is generated in the driven wheel; and driven torque correction means for correcting the driven torque so as to decrease as both the yaw rate difference and a wheel steering angle increase while said steering characteristic control means is operated.

3. A traction control system according to claim 2, wherein said driven torque correction means controls a correction by which the driven torque is decreased when both the wheel steering angle and the yaw rate difference are no greater than predetermined values.

4. A traction control system according to claim 2, wherein said driven torque correction means prohibits the driven torque from being corrected so as to decrease when both the wheel steering angle and the yaw rate difference are no greater than predetermined values.

5. A traction control system for a motor vehicle comprising:

steering characteristic control means for controlling a steering characteristic of the vehicle based on a yaw rate difference between an actual yaw rate and a target yaw rate of the vehicle;

target slip value providing means for providing a target slip value in a driven wheel;

driven torque control means for controlling driven torque applied to the driven wheel so that a slip in the driven wheel becomes equal to the target slip value while the slip is generated in the driven wheel; and target slip value correction means for weighting a wheel steering angle and the yaw rate difference and correcting the target slip value so that it decreases as the wheel steering angle and the yaw rate difference are more heavily weighted while said steering characteristic control means is operated.

6. A traction control system according to claim 5, wherein said target slip value correction means weights the wheel steering angle more than the yaw rate difference.

7. A traction control system for a motor vehicle comprising:

steering characteristic control means for controlling a steering characteristic of the vehicle based on a yaw rate difference between an actual yaw rate and a target yaw rate of the vehicle;

target slip value providing means for providing a target slip value in a driven wheel;

driven torque control means for controlling driven torque applied to the driven wheel so that a slip in the driven wheel becomes equal to the target slip value while the slip is generated in the driven wheel; and target slip value correction means for correcting the target slip value so that it decreases as the yaw rate difference increases while said steering characteristic control means is operated.

8. A traction control system for a motor vehicle comprising:

steering characteristic control means for controlling a steering characteristic of the vehicle based on a yaw rate difference between an actual yaw rate and a target yaw rate of the vehicle;

target slip value providing means for providing a target slip value in a driven wheel;

driven torque control means for controlling driven torque applied to the driven wheel so that a slip in the driven wheel becomes equal to the target slip value while the slip is generated in the driven wheel; and target slip value correction means for correcting the target slip value so that it decreases as a wheel steering angle increases while said steering characteristic control means is operated.

9. A traction control system for a motor vehicle comprising:

steering characteristic control means for controlling a steering characteristic of the vehicle based on a yaw rate difference between an actual yaw rate and a target yaw rate of the vehicle;

driven torque control means for controlling driven torque applied to a driven wheel while a slip is generated in the driven wheel;

rough road determination means for determining a rough road;

rough road correction means for correcting the driven torque so that the vehicle becomes stable when the rough road is determined; and rough road correction changing means for changing the corrected driven torque so that it decreases when the rough road is determined and both a wheel steering angle and the yaw rate difference are no less than predetermined values while said steering characteristic control means is operated.

10. A slip control system according to claim 9, wherein said rough road correction means increases the driven torque so that the vehicle is accelerated.

11. A slip control system according to claim 9, wherein said rough road correction means decreases the driven torque so that the vehicle is decelerated.

12. A traction control system for a motor vehicle comprising:

steering characteristic control means for controlling a steering characteristic of the vehicle based on a yaw rate difference between an actual yaw rate and a target yaw rate of the vehicle;

driven torque control means for controlling driven torque applied to a driven wheel while a slip is generated in the driven wheel;

rough road determination means for determining a rough road;

rough road correction means for correcting the driven torque so that the vehicle becomes stable when the rough road is determined; and rough road correction changing means for changing the corrected driven torque so that it decreases as a wheel steering angle increases while said steering characteristic control means is operated when the rough road is determined.

13. A slip control system according to claim 12, wherein said rough road correction means increases the driven torque so that the vehicle is accelerated.

14. A slip control system according to claim 12, wherein said rough road correction means decreases the driven torque so that the vehicle is decelerated.

15. A traction control system for a motor vehicle comprising:

steering characteristic control means for controlling a steering characteristic of the vehicle based on a yaw rate difference between an actual yaw rate and a target yaw rate of the vehicle;

driven torque control means for controlling driven torque applied to a driven wheel while a slip is generated in the driven wheel;

rough road determination means for determining a rough road;

rough road correction means for correcting the driven torque so that the vehicle becomes stable when the rough road is determined; and rough road correction changing means for decreasing the corrected driven torque as the yaw rate difference increases while said steering characteristic control means is operated when the rough road is determined.

16. A slip control system according to claim 15, wherein said rough road correction means increases the driven torque so that the vehicle is accelerated.

17. A slip control system according to claim 15, wherein said rough road correction means decreases the driven torque so that the vehicle is decelerated.

* * * * *